(12) United States Patent
Boule et al.

(10) Patent No.: US 11,042,340 B2
(45) Date of Patent: Jun. 22, 2021

(54) GENERATING NAVIGATION USER INTERFACES FOR THIRD-PARTY APPLICATIONS

(71) Applicant: Apple Inc., Cupertino, CA (US)

(72) Inventors: Andre M. Boule, San Jose, CA (US); Albert C. Wan, San Jose, CA (US); Michael L. Knippers, Pleasanton, CA (US); Emily C. Schubert, Los Gatos, WA (US); Jonathan D. Hersh, Cupertino, CA (US); Kevin R. Jorgensen, San Jose, CA (US); Christopher R. Whitney, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 164 days.

(21) Appl. No.: 16/373,446

(22) Filed: Apr. 2, 2019

(65) Prior Publication Data

US 2019/0339918 A1  Nov. 7, 2019

Related U.S. Application Data

(60) Provisional application No. 62/667,576, filed on May 6, 2018.

(51) Int. Cl.
*G06F 3/14* (2006.01)
*G06F 9/451* (2018.01)
*G06F 3/0481* (2013.01)
*G06F 3/0482* (2013.01)
(Continued)

(52) U.S. Cl.
CPC .............. *G06F 3/14* (2013.01); *G06F 3/0481* (2013.01); *G06F 3/0482* (2013.01); *G06F 3/04817* (2013.01); *G06F 9/451* (2018.02); *G06F 8/38* (2013.01); *G06F 9/44505* (2013.01); *G06F 9/452* (2018.02)

(58) Field of Classification Search
CPC .......... G06F 3/14; G06F 9/451; G06F 3/0481; G06F 3/04817; G06F 3/0482; G06F 9/452; G06F 8/38; G06F 9/44505
See application file for complete search history.

(56) References Cited

U.S. PATENT DOCUMENTS

| | | | |
|---|---|---|---|
| 6,934,740 B1 * | 8/2005 | Lawande | G06F 16/80 709/213 |
| 9,285,944 B1 * | 3/2016 | Penilla | G06F 3/0362 |
| 10,338,898 B2 * | 7/2019 | Savliwala | G06F 3/0482 |
| 2008/0275632 A1 * | 11/2008 | Cummings | G06F 3/0481 701/532 |

(Continued)

*Primary Examiner* — Tuyetlien T Tran
(74) *Attorney, Agent, or Firm* — Invoke

(57) ABSTRACT

In some implementations, a mobile device can generate graphical user interfaces (GUIs) on behalf of third-party applications for presentation by vehicle infotainment systems. The mobile device can obtain configuration information for the vehicle system. The mobile device (e.g., operating system) can be configured with various GUI templates that define the layout of various user input controls. The third-party application can provide a template identifier and map data to the operating system. The mobile device can generate a GUI for the third-party application specifically for display by the vehicle system based on the identified template, the map data, and the configuration information for the vehicle system. The mobile device can then send the generated GUI to the vehicle system and the vehicle system can present the GUI on a display of the vehicle system.

21 Claims, 20 Drawing Sheets

(51) Int. Cl.
*G06F 9/445* (2018.01)
*G06F 8/38* (2018.01)

(56) References Cited

U.S. PATENT DOCUMENTS

| | | | | |
|---|---|---|---|---|
| 2009/0210388 A1* | 8/2009 | Elson | ................ | G06F 16/29 |
| 2012/0166985 A1* | 6/2012 | Friend | ................ | G06F 9/454 |
| | | | | 715/765 |
| 2013/0275899 A1* | 10/2013 | Schubert | ............ | G06F 3/0481 |
| | | | | 715/765 |
| 2014/0277937 A1* | 9/2014 | Scholz | ................ | H04W 4/50 |
| | | | | 701/36 |
| 2014/0280580 A1* | 9/2014 | Langlois | ............. | B60K 37/06 |
| | | | | 709/204 |
| 2014/0365120 A1* | 12/2014 | Vulcano | ............. | G01C 21/3617 |
| | | | | 701/532 |
| 2014/0365895 A1* | 12/2014 | Magahern | ............ | G06F 9/451 |
| | | | | 715/727 |
| 2015/0193090 A1* | 7/2015 | Grover | ................ | G06F 9/445 |
| | | | | 715/745 |
| 2015/0370446 A1* | 12/2015 | Zhang | ............... | G06F 16/24578 |
| | | | | 715/716 |
| 2015/0370461 A1* | 12/2015 | Zhang | ................ | G06F 9/451 |
| | | | | 715/716 |
| 2016/0147762 A1* | 5/2016 | Yu | ................... | G06F 8/38 |
| | | | | 707/723 |
| 2017/0188201 A1* | 6/2017 | Cansino | ............. | G08G 1/09626 |
| 2019/0130008 A1* | 5/2019 | Nakagoe | ............. | G06F 16/254 |
| 2019/0138323 A1* | 5/2019 | Chiarella | ........... | G06F 9/451 |
| 2020/0107152 A1* | 4/2020 | Dotan-Cohen | ....... | G06Q 10/10 |

* cited by examiner

GENERATING NAVIGATION USER INTERFACES FOR THIRD-PARTY APPLICATIONS

TECHNICAL FIELD

The disclosure generally relates to generating graphical user interfaces for navigation applications.

BACKGROUND

Mobile devices, such as smartphones, are commonly used to perform navigation functions. The mobile devices can include navigation and/or mapping applications that present maps, search for locations, and/or provide navigation instructions. In fact, the navigation applications on mobile devices have become the primary way for users to navigate from one location to another. To leverage the navigation functionality of the mobile device, some in-vehicle infotainment systems (e.g., display screen, navigation system, radio system, etc.) are configured to interact with the mobile device such that the functionality of the mobile device can be accessed through the in-vehicle infotainment system.

SUMMARY

In some implementations, a mobile device can generate graphical user interfaces (GUIs) on behalf of third-party applications for presentation by vehicle infotainment systems. The mobile device can obtain configuration information for the vehicle system. The mobile device (e.g., operating system) can be configured with various GUI templates that define the layout of various user input controls. The third-party application can provide a template identifier and map data to the operating system. The mobile device can generate a GUI for the third-party application specifically for display by the vehicle system based on the identified template, the map data, and the configuration information for the vehicle system. The mobile device can then send the generated GUI to the vehicle system and the vehicle system can present the GUI on a display of the vehicle system.

Particular implementations provide at least the following advantages. By generating the graphical user interfaces for the third-party applications, the mobile device can present graphical user interfaces on the display of the vehicle system that have a consistent look and feel across applications. By generating the graphical user interfaces for the third-party applications, the mobile device can generate graphical user interfaces that are optimized for display by each of variety of vehicle systems without burdening third-party application providers with configuring third party applications to handle the different capabilities of various vehicle systems. By generating the graphical user interfaces for the third-party applications, the mobile device can manage interactions between third-party applications and the vehicle system to ensure that the GUIs presented by the vehicle system are appropriate for the current vehicle context (e.g., driving, stationary, parked, day, night, etc.). The templatized framework described herein allows third party applications to provide navigation functionality to users/drivers while promoting the safe use of mobile device and/or in-vehicle navigation systems.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
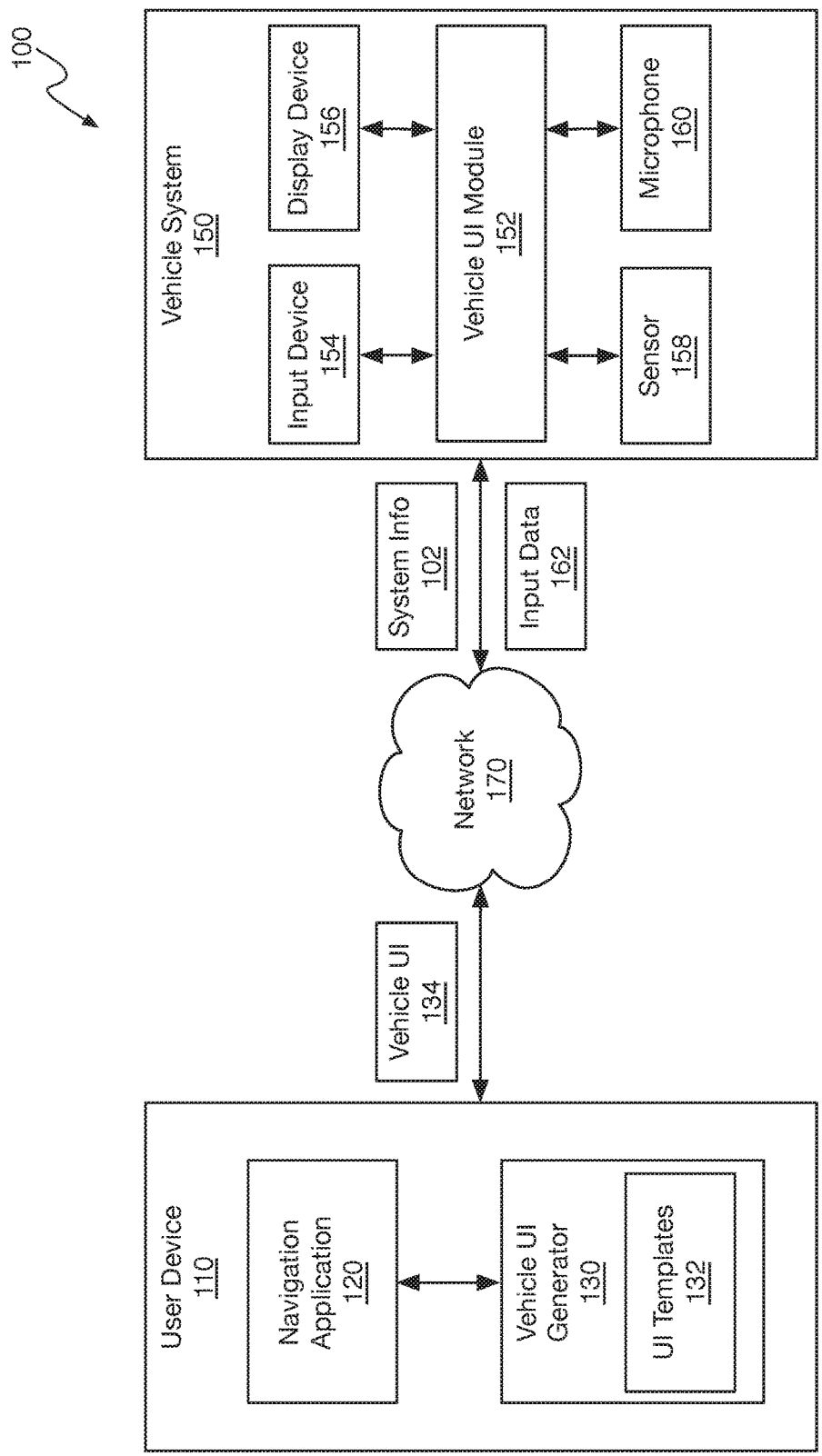
FIG. 1 is a block diagram of an example system for generating navigation user interfaces for third-party applications.

FIG. 1 is a block diagram of an example system 100 for generating navigation user interfaces for third-party applications. For example, system 100 can be configured to generate graphical user interfaces (GUIs) for an in-vehicle infotainment system (e.g., navigation system, music system, radio, display screen, combination thereof, etc.) on behalf of a software application running on a user device. The software application can be, for example, a third-party navigation application or other software application that is configured for use on or through the in-vehicle infotainment system (i.e., vehicle system). The GUIs generated for presentation on the vehicle system on behalf of the software application can be generated specifically for the in-vehicle environment and/or driving context. For example, rather than simply mirroring the same GUIs presented by the software application on the user device, the system can generate different GUIs specifically configured for the in-vehicle environment and/or driving context. For example, the GUIs specifically configured for the in-vehicle environment and/or driving context can include additional elements and/or features, fewer elements and/or features, and/or a different layout and/or organization of elements and/or features than the GUIs generated by the software application for presentation on the user device. These in-vehicle GUIs can be configured to promote the safe use of the software application in the in-vehicle environment.

In some implementations, system 100 can include user device 110. For example, user device 110 can be a computing device, such as a laptop computer, smartphone, tablet computer, smartwatch, or other mobile computing device.

User device 110 can include navigation application 120. For example, navigation application 120 can be a software application developed by a third-party software developer (e.g., not the first party developer who created user device 110 and/or the operating system thereof). Navigation application 120 can be configured to present various graphical user interfaces on a display of user device 110 for presenting maps, navigation instructions, search interfaces, search results, etc., to a user of user device 110.

In some implementations, navigation application 120 can be configured to provide navigation functionality to vehicle system 150 (e.g., infotainment system). To do so, navigation application 120 can interact with vehicle UI generator 130 to cause vehicle UI generator 130 to generate graphical user interfaces appropriate for an in-vehicle and/or driving context.

In some implementations, user device 110 can include vehicle UI (user interface) generator 130. For example, vehicle UI generator 130 can be a software module, library, process, or service provided by the operating system of user device 110. Vehicle UI generator 130 can be configured with various UI templates 132 that define (or predefine) the layout of controls, graphical elements, informational areas, etc., for the navigational graphical user interfaces to be presented by vehicle system 150. To generate GUIs that are appropriate to the specific vehicle system to which user device 110 is connected, vehicle UI generator 130 can obtain vehicle system information 102 from vehicle system 150 when user device 110 is connected to vehicle system 150. For example, vehicle system information 102 can include information describing the user input capabilities (e.g., touch screen input, physical button and/or knob controls, voice control, etc.) of vehicle system 150. Vehicle system information 102 can include information describing the display capabilities (e.g., touch input screen, high definition, low definition, display size, color capabilities, etc.) of vehicle system 150. Vehicle system information 102 can include information describing the sensor capabilities (e.g., light sensors, speed sensors, microphone, etc.) of vehicle system 150. Vehicle UI generator 130 can generate GUIs for display by vehicle system 150 based on the specific vehicle system capabilities obtained from vehicle system information 150. For example, Vehicle GUI generator 130 can generate GUIs based on UI templates 130 and adjusted for the specific display size, color characteristics, light conditions, and/or current travelling speed of vehicle system 150.

While UI templates 132 define the layout and appearance of the various graphical user interfaces generated by vehicle UI generator 130 for display by vehicle system 150, navigation application 120 provides the content for each GUI element, control, and informational area. Moreover, navigation application 120 provides the functionality for the features presented by the GUIs generated by vehicle UI generator 130 and presented by vehicle system 150. For example, when a user provides input to a control or other graphical element on a navigational GUI presented by vehicle system 150, vehicle UI generator 130 can send a message to navigation application 120 including input data that identifies the control and/or any other data input (e.g., text input, character input, search queries, etc.) provided by the user. Navigation application 120 can then perform the appropriate function in response to receiving the input data, including causing vehicle UI generator 130 to generate new GUIs for display on vehicle system 150.

After vehicle UI generator 130 generates a graphical user interface for navigation application 120 based on the content provided by navigation application 120, UI templates 132, and the vehicle system information 102, vehicle UI generator 130 can send the generated vehicle UI 134 to vehicle system 150 for presentation to the user. For example, user device 110 and/or navigation application 120 can send and receive data, including system information 102, vehicle UI 134, and input data 162, through network 170. In some implementations, network 170 can correspond to a direct wired connection between user device 110 and vehicle system 150. In some implementations, network 170 can correspond to a wireless connection between user device 110 and vehicle system 150.

In some implementations, system 100 can include vehicle system 150. For example, vehicle system 150 can be an in-vehicle computing device configured to provide various features and/or services to the user. Vehicle system 150 can provide vehicle operating information and diagnostics. Vehicle system 150 can provide entertainment features, such as streaming music, radio, video, etc. Vehicle system 150 can include built-in software applications and/or other software features.

In some implementations, vehicle system 150 can include vehicle UI module 152 (e.g., a software module, software service, etc.) that is configured to interact with vehicle UI generator 130 on user device 110 to present navigational GUIs generated by vehicle UI generator 130 (e.g., received in vehicle UI message 134) and to send input data 162 back to user device 110 when the user provides input to a GUI generated by vehicle UI generator 130 and presented by vehicle system 150. For example, vehicle UI module 152 can serve as the vehicle-side interface between user device 110 and vehicle system 150. Thus, vehicle UI module 152 can receive GUIs from user device 110 and cause vehicle system 150 to present the received GUIs on display device 156. Vehicle UI module 152 can receive user and/or sensor input from vehicle system 150 and send the user and/or sensor input as input data 162 to user device 110.

In some implementations, vehicle system 150 can include input device 154. For example, input device 154 can be a single input device or multiple input devices. Input device 154 can be a touch screen device capable of detecting and processing touch input provided by a user of vehicle system 150 to select various graphical elements on a GUI presented by vehicle system 150. Input device 154 can correspond to physical input controls, such as knobs, physical buttons, etc. For example, the user can manipulate the physical controls to navigate through and/or select various GUI elements and controls included on GUIs presented by vehicle system 150. Input device 154 can correspond to a sensor, such as a microphone. For example, the user can provide input as spoken voice commands to vehicle system 150. Vehicle system 150 can interpret the voice commands and perform the appropriate action.

In some implementations, vehicle system 150 can include display device 156. For example, display device 156 can be a single display device or multiple display devices. Display device 156 can correspond to a touch screen display device. Display device 156 can correspond to a non-touch screen display device that is not capable of detecting touch input. Display device 156 can be disposed in a dashboard and/or instrument panel of the vehicle in which vehicle system 150 is mounted.

In some implementations, vehicle system 150 can include sensor 158. For example, sensor 158 can be a single sensor or multiple sensors. Sensor 158 can correspond to a light sensor for detecting ambient light conditions in and/or around the vehicle or vehicle system 150. Sensor 158 can correspond to a speed sensor for determining when the vehicle is moving and/or how fast the vehicle is moving. In some implementations, when sensor 158 detects and/or generates sensor data, sensor 158 can send the sensor data to vehicle UI module 152. Vehicle UI module 152 can then send the sensor data to user device 110 as input data 162. Vehicle UI generator 130 and/or navigation application 120 can then use the sensor data to adjust the GUIs and/or GUI data to be presented by vehicle system 150. For example, vehicle UI generator 130 can use the light sensor data to determine whether to generate graphical user interfaces using a night time color scheme or a day time color scheme. Vehicle UI generator 130 can use the speed sensor data to determine whether to limit access to various GUIs and/or GUI data while the vehicle is moving.

In some implementations, vehicle system 150 can include microphone 160. For example, vehicle system 150 can include one or more microphones 160 to receive voice input, such as spoken commands, and/or to provide other hands-free voice features to the user.

Figure 2:
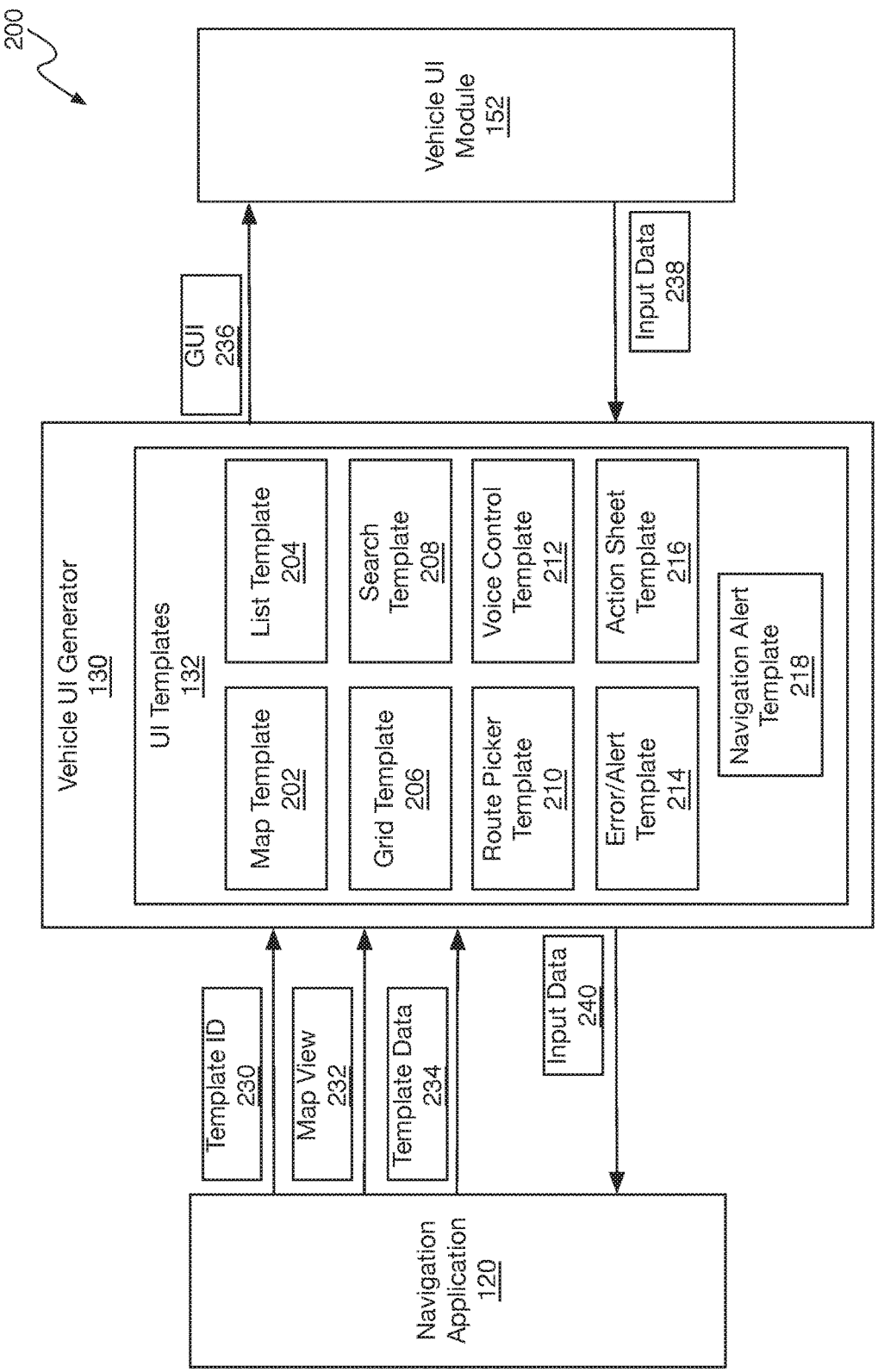
FIG. 2 is a block diagram of an example system for generating navigational GUIs using UI templates.

FIG. 2 is a block diagram of an example system 200 for generating navigational GUIs using UI templates. For example, system 200 can correspond to system 100. As described above, UI templates 132 can include (e.g., be configured, preconfigured, etc.) with various generic navigational GUI templates that define the layout, look, and feel of navigational GUIs to be presented by vehicle system 150. For example, UI templates 132 can include a map template 202, list template 204, grid template 206, search template 208, route picker template 210, voice control template 212, error/alert template 214, action sheet template 216, and/or navigation alert template 218. Each of these templates is described in greater detail below. However, each of the templates includes a predefined (e.g., maximum) number of controls (e.g. buttons) at predefined locations within each template. Each of the templates can include informational areas at predefined locations within each template. Each of the templates can be configured to present data, controls, information, text, etc., using a color scheme that is selected or optimized based on the vehicle system information received from vehicle system 150, as described above. While the number of controls, layout of controls, layout of informational elements, and color scheme is defined by UI templates 132 and/or vehicle UI generator 130, navigation application 120 provides the content for populating the templates and the navigation application features triggered by the various controls and/or user input elements.

To cause vehicle UI generator 130 to generate a vehicle GUI for navigation application 120, navigation application 120 can send a template identifier 230, map view 232, and/or template data 234 to vehicle UI generator 130. For example, navigation application 120 can determine (e.g., based on the data to be presented to the user) which type of template is required to present the GUI content, instructions, and/or controls on the display of vehicle system 150. The data to be presented to the user by navigation application 120 through vehicle system 150 will vary based on the configuration and/or programming of navigation application 120 and/or the user input received by navigation application 120.

Navigation application 120 generate or provide map views 232 to vehicle UI generator 130 for presentation by vehicle system 150. For example, navigation application 120 can generate various map views (e.g., map tiles, map images, raster tiles, etc.) based on the operating context of navigation application 120. Navigation application 120 can generate and/or provide map views corresponding to a route being traversed by the user operating a vehicle in which user device 110 and/or vehicle system 150 is situated. Navigation application 120 can generate and/or provide map views corresponding to a route preview to be presented by vehicle system 150. Navigation application 120 can generate and/or provide map views showing an area around a selected destination or multiple candidate destinations (e.g., as a result of a search query). The map views generated and/or provided by navigation application 120 may include various map elements, including roads, buildings, graphical elements representing a selected destination, and/or graphical elements representing one or more selected and/or candidate routes.

Navigation application 120 can generate and provide template data 234 to vehicle UI generator 130. For example, navigation application 120 can provide data for populating the various graphical elements in the identified template. For example, navigation application 120 can provide text and/or images for populating informational areas with navigation instructions and/or route or trip information for the user. Where a template accepts text for a graphical element (e.g., button, informational area, etc.), navigation application 120 can provide multiple text variants of different string/character lengths. Vehicle UI generator 130 can select (e.g., based on vehicle system information 102) the text variant that fits within the constraints of the vehicle system display and/or the GUI generated by vehicle UI generator 130. Vehicle UI generator can, for example, select the text variant that provides the most information (e.g., longest string) and that fits within the GUI generated based on the vehicle system information 102 (e.g., size of display 156). For example, vehicle displays having wider screens would allow more text to be displayed on the full screen alert template and/or banner notification than would a narrow screen.

Navigation application 120 can specify in template data 234 which graphical elements to enable or disable within the identified template. For example, the identified template can specify a maximum number and/or placement of graphical elements (e.g., buttons, controls, informational areas, panels, etc.) on a GUI. However, navigation application 120 can specify which of the identified template's graphical elements should be presented or hidden when the GUI is presented by vehicle system 120. Navigation application 120 can provide labels, images, etc., for the buttons to be presented on the GUI generated from the UI the template. Navigation application 120 can specify navigation application APIs, functions, or message types for each graphical element in the template to be called or generated in response to a user selection of a corresponding graphical element. For example, navigation application 120 can specify that a search API of navigation application 120 should be called or invoked in response to the user selecting a particular button presented by a GUI template. Navigation application 120 can specify that a message indicating a panning (e.g., scrolling) direction should be sent to navigation application 120 in response to the user selecting a particular directional button presented by a GUI template so that navigation application 120 can generate a map view for an adjacent map area into which the user has panned the display. These are just a few examples of the types of interactions that can be defined through the GUI templates; additional examples are provided herein below with reference to individual template types.

In some implementations, vehicle UI generator 130 can generate a graphical user interface based on the template identifier 230, map view 232, and/or template data 234. For example, vehicle UI generator 130 can generate a graphical user interface (GUI 236) by combining the identified template, the map view 232, and template data, as described further below with reference to FIG. 3. In some implementations, vehicle IU generator 130 can adjust or modify the template and/or GUI based on sensor data or other input data. For example, vehicle UI generator 130 can adjust the color scheme for the GUI based on the amount of light detected by a light sensor connected to vehicle system 150. Vehicle UI generator 130 can adjust access to various GUI features, data, and/or controls based on speed sensor data indicating that the vehicle the user is driving is moving or stationary. For example, vehicle UI generator can reduce the number of items presented in lists (e.g., search results) while driving so that the user does not spend too much time looking at the display of vehicle system 150 while driving. Longer lists can be presented while the vehicle is stationary. Vehicle UI generator can remove access to the search template while driving so that the user does not spend too much time looking at the display of vehicle system 150 while driving. Access to the search template can be allowed when the vehicle is stationary.

After generating GUI 236, vehicle UI generator 130 can send GUI 236 to vehicle UI module 152. For example, upon receipt of GUI 236, vehicle UI module 152 can present GUI 236 on the display of vehicle system 152. Additionally, vehicle UI module 152 can process user and/or sensor input received by vehicle system 152. For example, when the user provides input (e.g., using a touch screen display, physical controls, physical knobs, physical buttons, voice input, etc.), vehicle UI module 152 can process the input and send input data 238 describing the input to vehicle UI generator 130. Vehicle UI generator 130 can process input data 238 to determine which graphical elements (e.g., controls, buttons, keys, etc.) presented on GUI 236 were selected. Vehicle UI generator 130 can process input data 238 to determine what GUI adjustments to make based on the sensor data. Vehicle UI generator 130 can send the input data 240 in a message or API call to navigation application 120 so that navigation application 120 can respond appropriately to the user and/or sensor input.

In some implementations, navigation application 120 may respond to the user and/or sensor input by causing vehicle UI generator 130 to generate another GUI for presentation by vehicle system 150. For example, navigation application 120 can send a different template identifier, map view, and template data to vehicle UI generator 130 to change the GUI presented by vehicle system 150.

Figure 3:
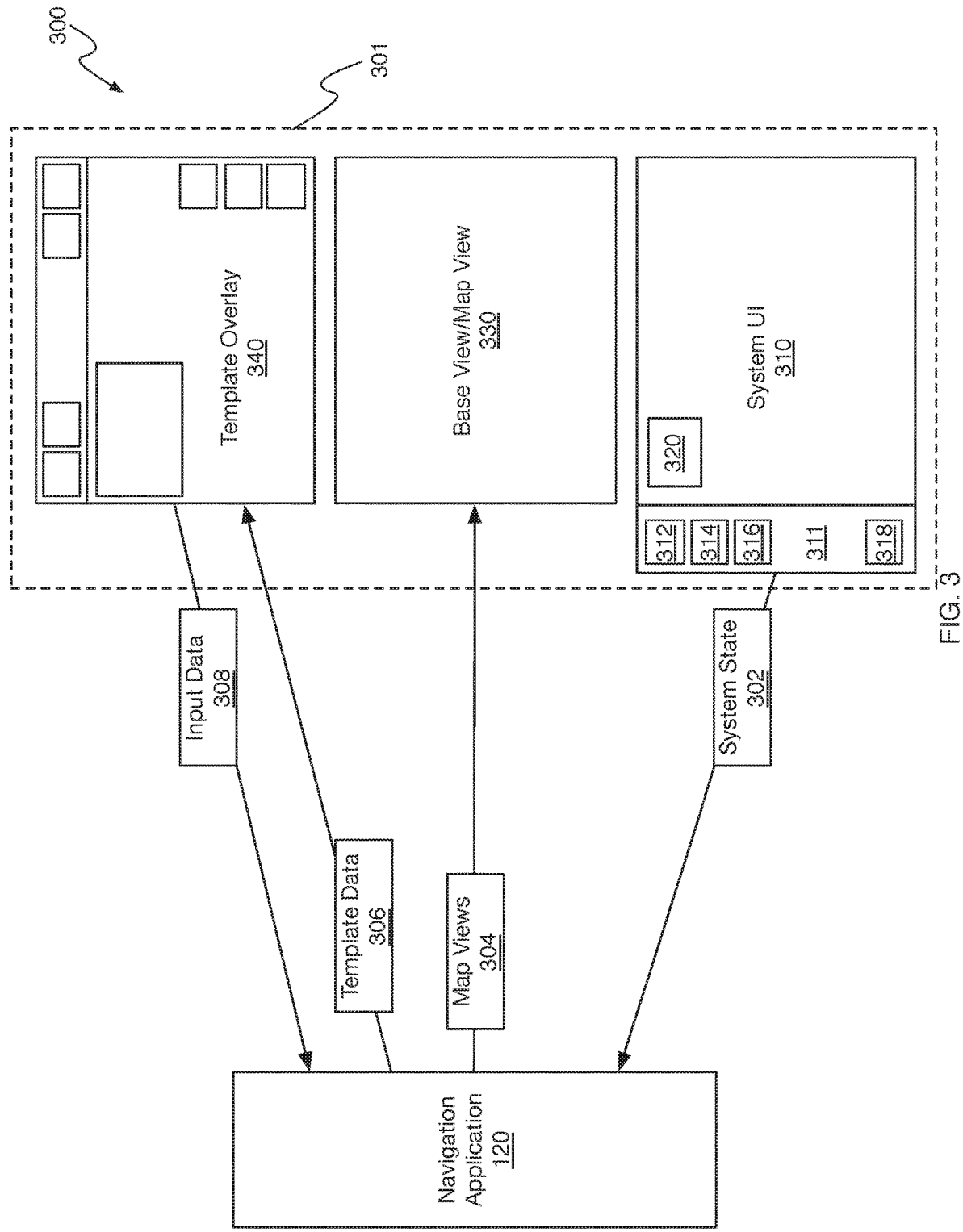
FIG. 3 is a block diagram of an example system for generating navigational GUIs using UI templates.

FIG. 3 is a block diagram of an example system 300 for generating navigational GUIs using UI templates. For example, system 300 can correspond to system 200 of FIG. 2 and system 100 of FIG. 1, described above. FIG. 3 illustrates how a graphical user interface for navigation application 120 can be generated for display by vehicle system 150 by combining different GUI layers and the interactions between navigation application 120 and the different layers.

As described above, a graphical user interface (e.g., GUI 301) can be generated by combining data provided by navigation application 120 with graphical elements and/or user interface templates provided by vehicle UI generator 130.

GUI 301 can be constructed by combining different GUI layers. For example, vehicle UI generator 130 can provide a system user interface layer 310 that provides a GUI for accessing system level functionality and/or applications. System UI layer 310 can serve as the backdrop (e.g., similar to computer desktop or home screen displays) for functionality and applications provided by vehicle UI module 152 and/or user device 110.

System UI layer 310 can include system sidebar 311. Sidebar 311 can include graphical element 312 representing the current foreground application. Sidebar 311 can include graphical element 314 and 316 representing other system applications, such as a music application and/or telephone application provided by user device 110. Sidebar 311 can include graphical element 318 that when selected causes the current foreground application to run in the background and causes system UI layer 310 to be presented in the foreground on the display.

System UI layer 310 can include one or more graphical elements 320 representing other first or third-party applications configured to be presented by vehicle system 150. For example, when navigation application 120 is configured to present graphical user interfaces on and interoperate with navigation system 150, graphical element 320 can represent navigation application 120. When a user selects graphical element 320, navigation application 120 can be invoked on user device 110 and can cause navigational graphical user interfaces to be presented by vehicle system 150, as described herein.

When a system level event is detected (e.g., an application invocation, input causing an application to run in the background, etc.), a system state message 302 can be sent to navigation application 120. Navigation application 120 can use the system state information in system state message 302 to determine the appropriate GUI templates to select for presenting navigation information on vehicle system 150 based on the current system state.

In some implementations, GUI 301 can include a base view (i.e., map view) layer 330. For example, the base view layer 330 is a navigation application layer that is generated based on the map view 304 (e.g., map image) provided by navigation application 120. Base view layer 330 can be presented on top of system UI layer 310 such that sidebar 311 is still visible, as illustrated in the following figures. Navigation application 120 can draw maps, icons, routes, buildings, and/or any other map graphical elements in or on base view 330. However, base view 330 provides no control or user input functionality. For example, if navigation application 120 were to draw a user interface control (e.g., button) on base view layer 330, there would be no way for the user to select the user interface control and no way for user input with respect to the user interface control to be returned to navigation application 120.

In some implementations, GUI 301 can include a template overlay layer 340. For example, template overlay layer 340 can include a template selected or identified by navigation application 120 and template data 306 that provides content for each graphical element (e.g., button, informational area, etc.) defined by the identified template. While navigation application 120 provides the content data for template overlay layer 340, vehicle UI generator 130 generates template overlay layer 340 by combining the content data with the template selected and/or identified by navigation application 120. For example, each graphical object in a template can be associated with an identifier. Template data 306 can provide a mapping between template element identifiers and content to be presented in the identified template element. Navigation application 120 can specify in template data 306 which template graphical elements to hide, but navigation application 120 cannot cause a template to present more graphical elements than what are predefined for the identified template.

Figure 4:
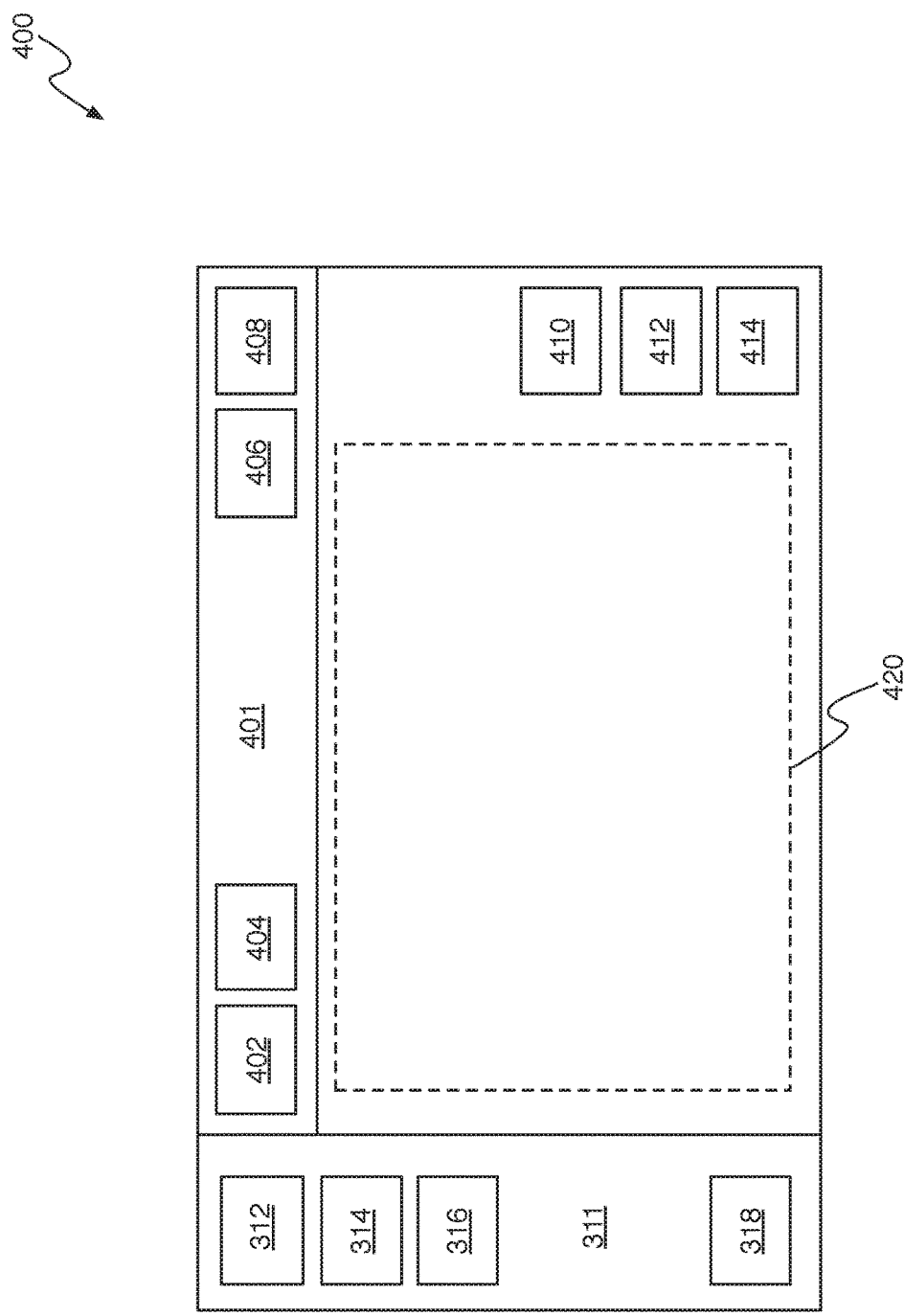
FIG. 4 illustrates an example map template.

While base view layer 330 is not configured for user input and/or control feedback to navigation application 120, template overlay layer 340 provides user input controls and, therefore, is configured to provide user input data 308 to navigation application 308. User input data 308 can include information describing or identifying which user interface controls presented by template overlay layer 340 have been selected by the user thereby allowing navigation application 120 to generate an appropriate response to the user input. Vehicle UI generator 130 can generate GUI 301 for navigation application 120 by combining the layers 310, 330, and 340 by drawing base view layer 330 over system UI layer 310, and template overlay layer 340 over base view layer 330, as illustrated by FIG. 4 and the GUI figures that follow. Thus, GUI 301 is generated by sandwiching base layer 330 generated by navigation application 120 between the system UI layer 310 and the template overlay layer 340 generated by the operating system (e.g., vehicle UI generator 130 of user device 110.

While the base view layer 330 (e.g., map layer) covers most of the system UI layer 310 (e.g., except for sidebar 311), the map presented by base view layer 330 can be, in most templates, viewed through areas of template overlay layer 340 that do not present user interface controls (e.g., buttons, informational elements, other graphical elements, etc.). In the template descriptions that follow, where a template is not described as completely obscuring or covering base view layer 330, the template is transparent with respect to areas not covered by user interface control elements. These transparent areas where the map can be seen or viewed by the user through a template overlay can be referred to as safe areas (e.g., areas that are safe for navigation application 120 to draw map features for presentation to the user) within the GUI generated by vehicle UI generator 130.

FIG. 4 illustrates an example map template 400. For example, map template 400 can correspond to template overlay layer 340. Map template 400 is a control layer that appears as an overlay over base view 330 and allows navigation application 120 to present user controls. Map template 400 includes navigation bar 401 and map buttons 410. 412, and/or 414. By default, the navigation bar appears when the user interacts with the navigation application 120, and disappears after a period (e.g., 5 seconds) of inactivity. The navigation bar includes up to two (2) leading buttons 402 and/or 404 and up to two (2) trailing buttons 406 and/or 408. Navigation application 120 can customize the appearance of these buttons with images or text. Navigation application 120 can customize the functions of navigation application 120 invoked by these navigation bar buttons. For example, buttons 402-408 can be individually configured to invoke different functions of navigation application 120. For example, button 402 can invoke a destination search function when selected. Button 404 can invoke a destination browsing function when selected. Button 406 can invoke a voice input mode of navigation application 120. Button 408 can invoke other functions provided by navigation application 120. Map template 400 may include up to three (3) map buttons 410, 412, and/or 414. The map buttons can be shown as icons (e.g., without text). Navigation application 120 can specify functions of navigation application 120 to call when each button is selected. For example, navigation application 120 can enter panning mode, zoom in or out, and perform other functions by responding to user actions on the map buttons 410, 412, and/or 414.

In some implementations, when generating a graphical user interface for navigation application 120 using templates, as described herein, vehicle UI generator can determine a safe area 420 within the generated GUI. For example, safe area 420 can be an area within the generated graphical interface where an overlay or overlay graphical element is not obscuring the underlying map. Vehicle UI generator can send information to navigation application 120 indicating where safe area 420 is located within the generated GUI so that navigation application 120 can draw important map elements (e.g., routes, destinations, etc.) on base layer 330 in areas of base layer 330 not obscured by the selected or identified template overlay.

Figure 5:
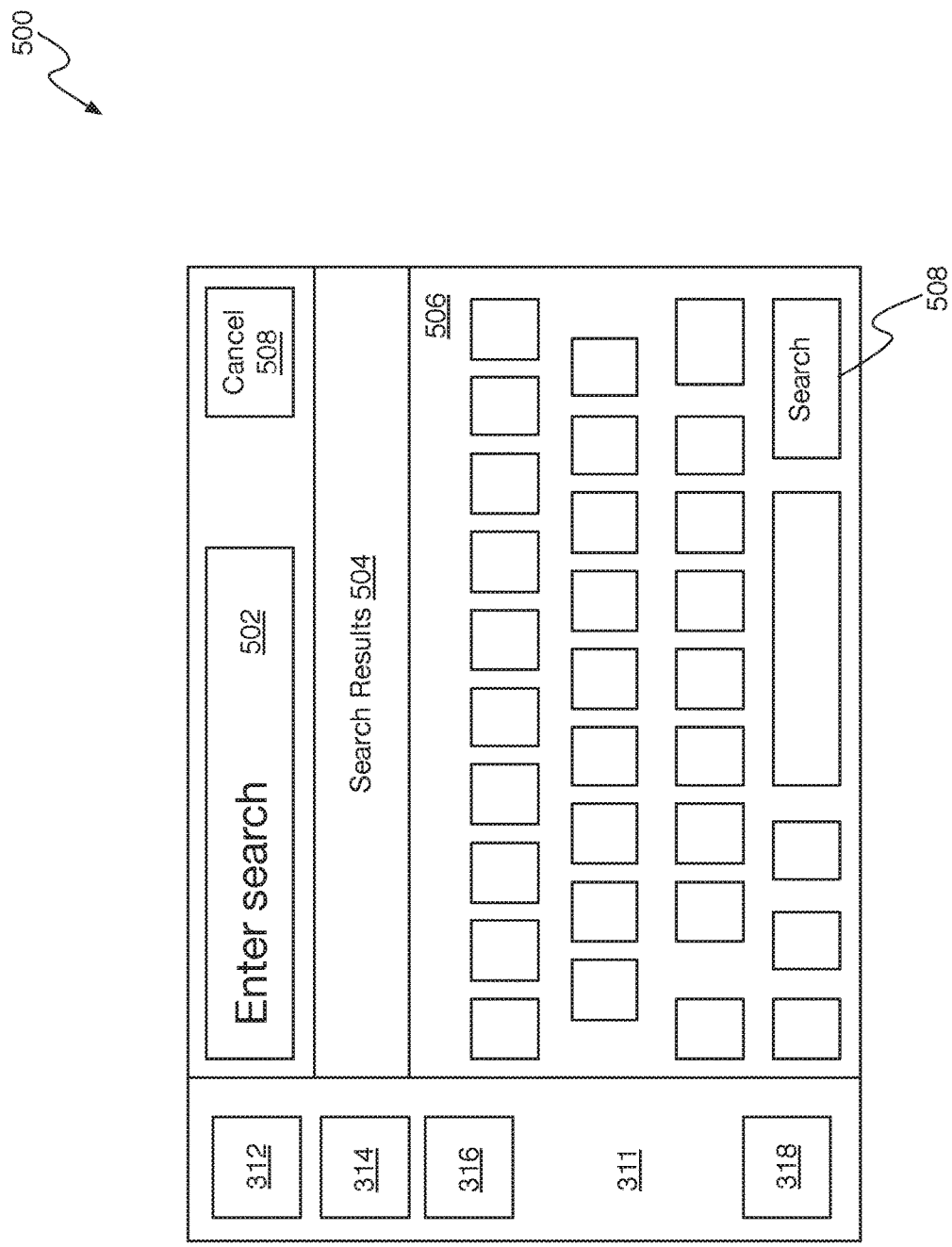
FIG. 5 illustrates an example search template for vehicle system displays configured for touch input.

FIG. 5 illustrates an example search template 500 for vehicle system displays configured for touch input. For example, search template 500 can correspond to template overlay layer 340. In some implementations, search template 500 can completely cover or obscure the map drawn on base layer 330.

Search template 500 allows navigation application 120 to present a destination search screen. For example, search template 500 can include a search field 502, a cancel button 508, a list of search results 504, and a keyboard view 506. The keyboard is automatically shown in the appropriate language and is managed by the operating system (e.g., vehicle UI generator 130) of user device 110. The type of keyboard presented in search template 500 is selected based on the input capabilities of vehicle system 150. For example, when vehicle system 150 is capable of receiving touch input, a virtual touch keyboard can be presented in area 506. When vehicle system 150 is not capable of receiving touch input, physical controls (e.g., physical buttons, knobs, rotary controls, etc.) may be used to select input characters, as described further below with reference to FIG. 6. Each keyboard character selected by the user will cause the character to appear in the search field 502. Each character and/or text in the search field 502 can be sent to navigation application 120 as they are entered and/or in response to a user selection of graphical element 508. For example, navigation application 120 can parse the search text and update the list of search results 504 based on a search performed by navigation application 120.

Figure 6:
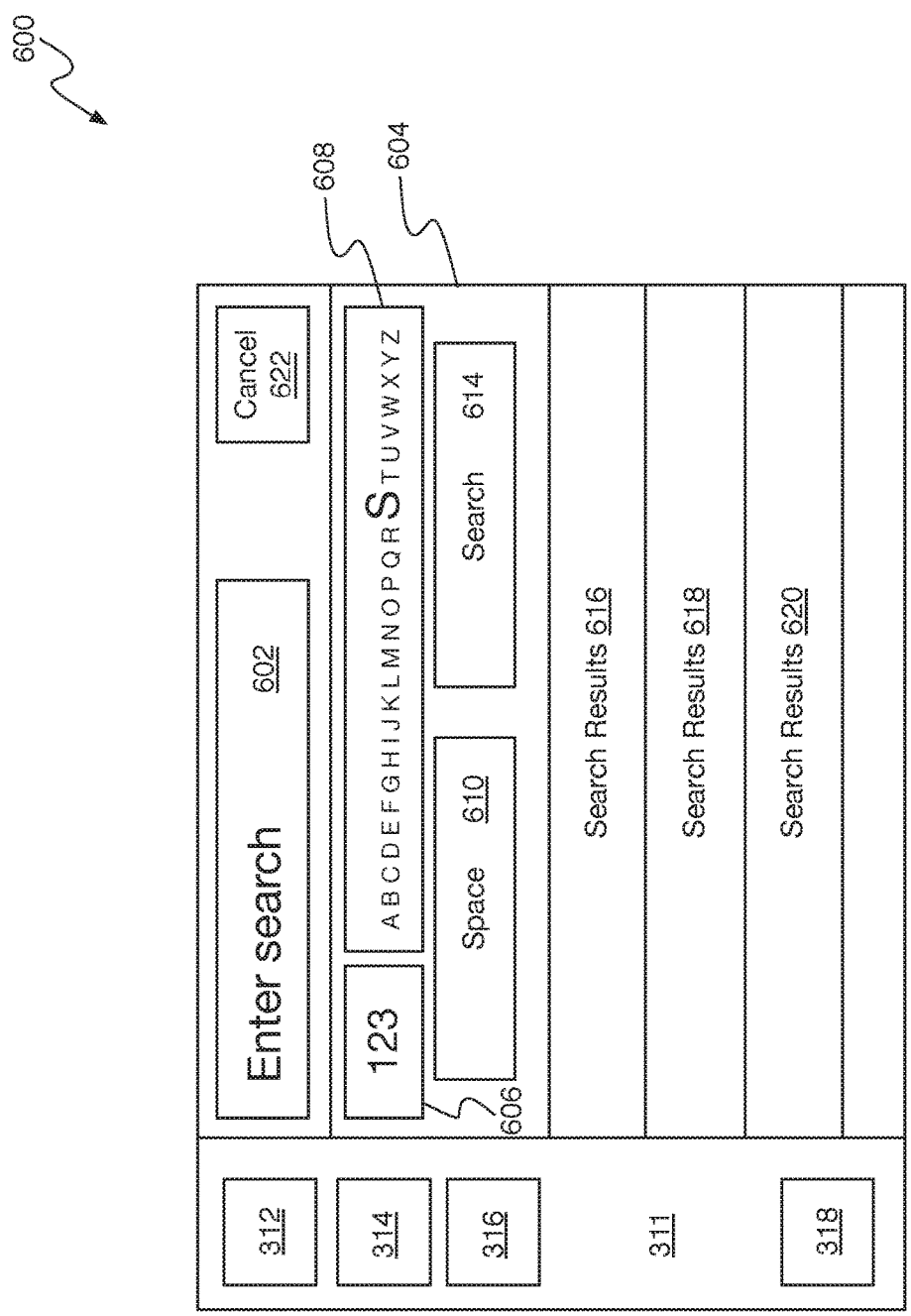
FIG. 6 illustrates an example search template for vehicle systems displays that are not configured for touch input.

Vehicle UI generator 130 can automatically select the type of keyboard based on the user interaction that caused the search template to appear. For example, if the user used physical controls to provide the input that caused the search template to appear, then vehicle UI generator 130 can cause a keyboard appropriate for the physical input device to appear (e.g., as illustrated by FIG. 6). If the user used touch screen input controls to provide the input that caused the search template to appear, then vehicle UI generator 130 can cause a keyboard appropriate for the touch screen input to appear (e.g., as illustrated by FIG. 5).

When a user selects an item from search results 504, navigation application 120 can receive information associated with the selected item and generate an appropriate response (e.g., present a destination, destination preview, or route) using the template overlays and base view (map view) described herein and according to the programming of navigation application 120.

FIG. 6 illustrates an example search template 600 for vehicle systems displays that are not configured for touch input. For example, search template 600 can correspond to template overlay layer 340. In some implementations, search template 600 can completely cover or obscure the map drawn on base layer 330.

Search template 600 allows navigation application 120 to present a destination search screen. For example, search template 600 can include a search field 602, a cancel button 622, a list of search results 616, 618, and/or 620, and scrollable input area 604 for providing character input to search field 602. The text and/or characters in input area 604 is automatically shown in the appropriate language and is managed by the operating system of user device 110. The scrollable input area 604 is presented in search template 600 based on the input capabilities of vehicle system 150. For example, when vehicle system 150 is not capable of receiving touch input (e.g., relies upon physical controls, knobs, etc.), a scrollable input area 604 can be presented so that the user can use the physical controls of vehicle system 150 to scroll through and select characters from numbers list 606, letter list 608, and/or space bar 610 as input to search filed 602. Each keyboard character selected by the user will cause the character to appear in the search field 602. Each character and/or text in the search field 602 can be sent to navigation application 120 as they are entered and/or in response to a user selection of graphical element 614. For example, navigation application 120 can parse the search text and update the list of search results 616, 618, and/or 620 based on a search performed by navigation application 120.

When a user selects an item from search results 616, 618, and/or 620, navigation application 120 can receive information associated with the selected item and generate an appropriate response (e.g., present a destination, destination preview, or route) using the template overlays and base view described herein and according to the programming of navigation application 120.

Figure 7:
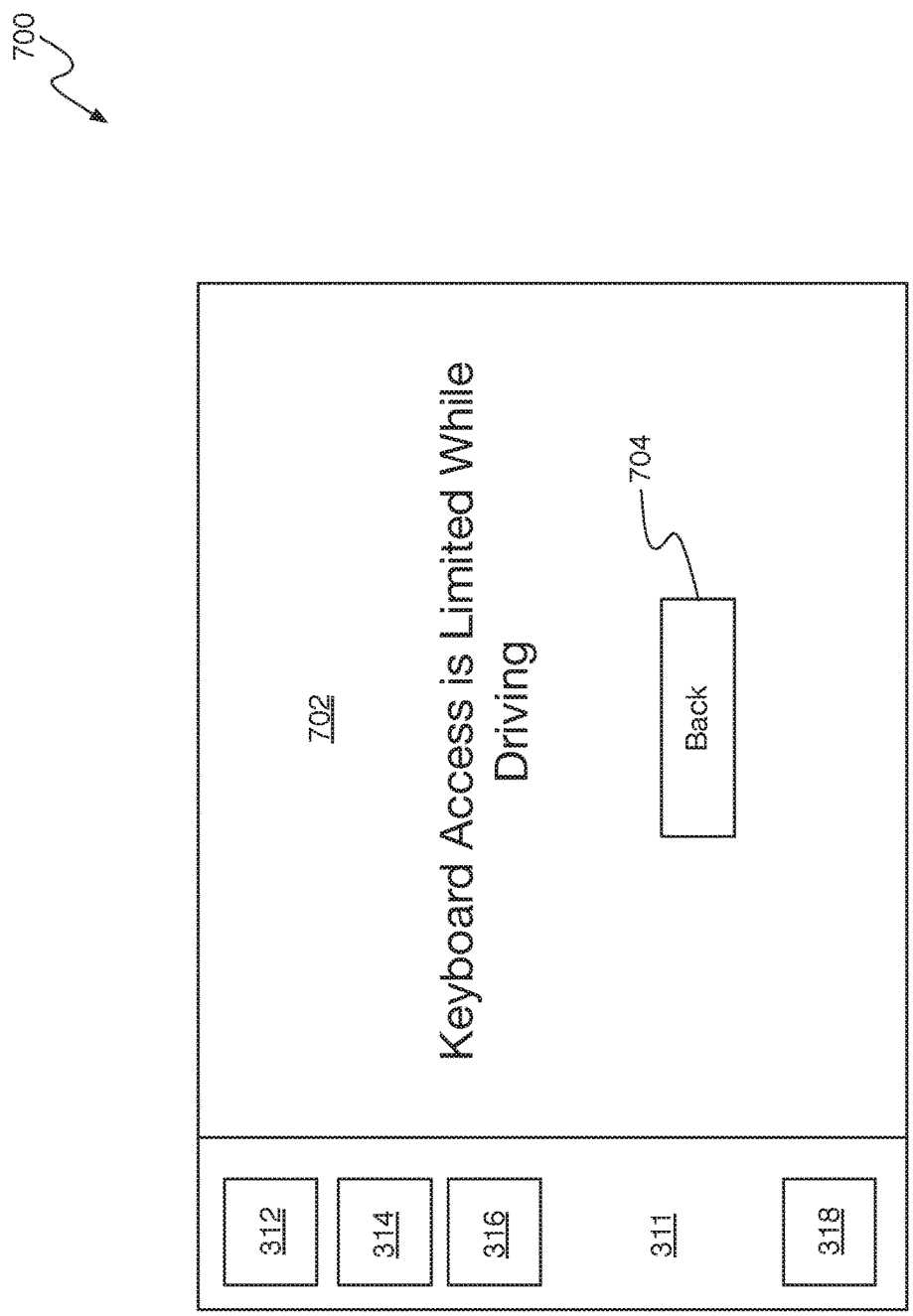
FIG. 7 illustrates an example full screen alert template.

FIG. 7 illustrates an example full screen alert template 700. For example, full screen alert template 700 can correspond to template overlay layer 340. In some implementations, full screen alert template 700 can completely cover or obscure the map drawn on base layer 330. In some implementations, full screen alert template 700 can completely cover or obscure other templates, such as search templates 500 and/or 600 described above.

In some implementations, navigation application 120 can be configured to cause vehicle UI generator 130 and/or vehicle system 150 to present full screen alerts. For example, a full screen alert can be presented when navigation application 120 presents information indicating the end of a navigated route. Thus, a GUI generated based on full screen alert template 700 may be generated when the user attempts to invoke a search interface generated based on templates 500 and/or 600 described above. For example, keyboard access may be limited while the user is driving.

In some instances, a full screen alert can be presented when the operating system of user device 110 and/or vehicle system 150 presents information identifying restricted features that the user is trying to access. Full screen alert template 700 can include alert area 702 in which navigation application 120, the operating system of user device 110, and/or vehicle system 150 can present a message. Full screen alert template 700 can include up to two buttons that can be configured with text and that will, when selected, cause navigation application 120, the operating system of user device 110, and/or vehicle system 150 to perform a function associated with the selected button. For example, button 704 can be configured to dismiss the full screen alert and return to the previous GUI or another GUI determined by navigation application 120, the operating system of user device 110, and/or vehicle system 150.

Figure 8:
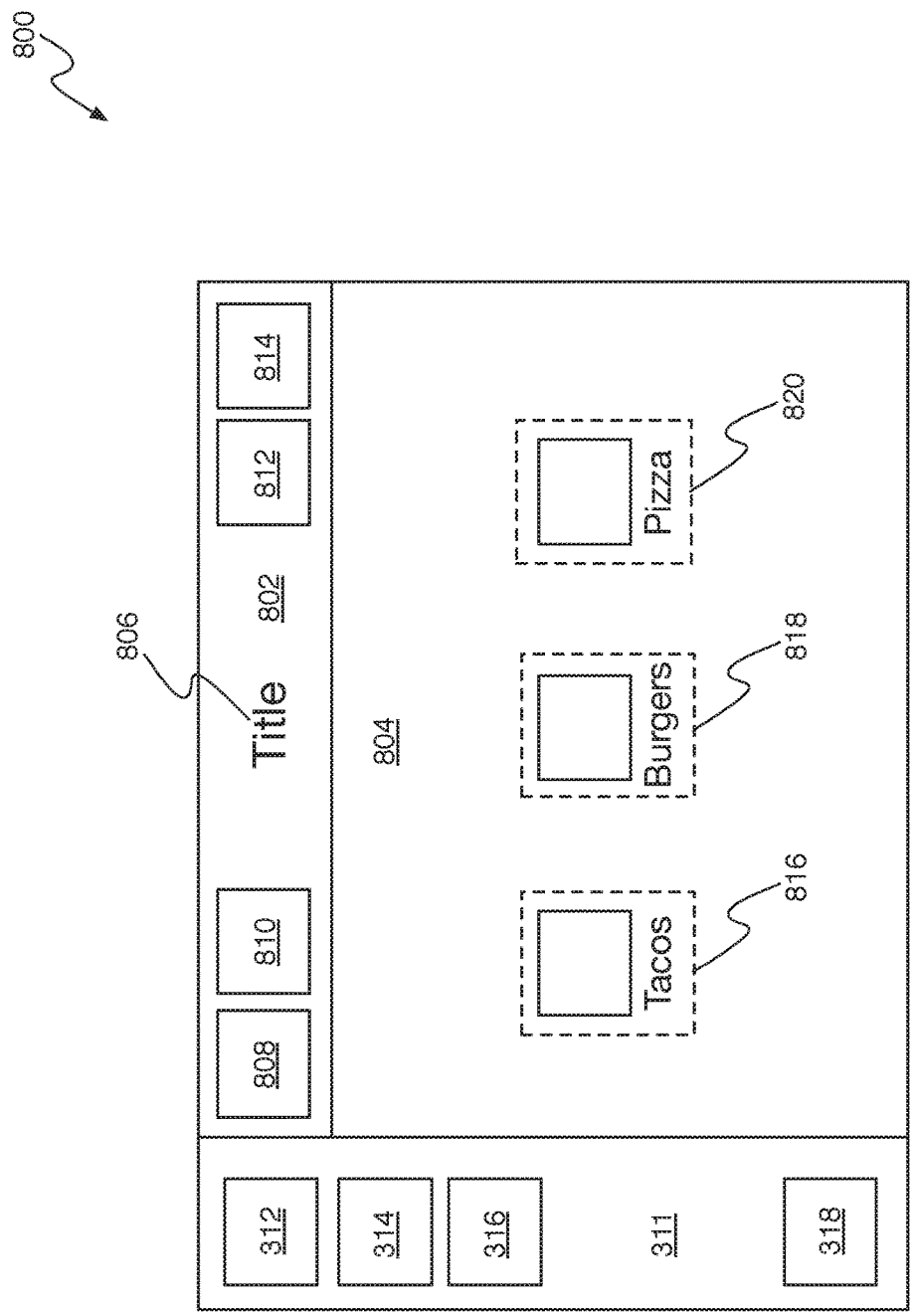
FIG. 8 illustrates an example grid template.

FIG. 8 illustrates an example grid template 800. For example, grid template 800 can correspond to template overlay layer 340. In some implementations, grid template 800 can completely cover or obscure the map drawn on base layer 330. For example, grid template 800 can be populated with content by navigation application 120 to generate a destination browser GUI for display by navigation system 150. Navigation application 120 may cause the destination browser GUI to be generated by vehicle UI generator 130 and presented by vehicle system 150 in response to the user selecting a graphical object (e.g. button 402, 404, 406 or 408 presented by map template 400).

In some implementations, grid template 800 allows navigation application 120 to present a grid of menu items. Grid template 800 can include navigation bar 802 and a grid view 804. Navigation bar 802 can include a title 806, and up to two (2) leading buttons (808, 810) and two (2) trailing buttons (812, 814). Navigation application 120 customize the appearance of these buttons with icons or text and/or specify functions of navigation application 120 to call when each button is selected. Navigation application 120 can configure grid view 804 to include up to eight (8) items (e.g., items 816, 818, 820, etc.). Each item in grid view 804 can include an icon and a title. For example, to generate a destination browsing GUI, navigation application 120 can determine a category (e.g., type of food, tacos, burgers, pizza, etc.) for each grid view item 816, 818, and/or 820. When the user selects grid view item (e.g., item 816), navigation application 120 can perform a destination search for destinations associated with the category corresponding to the selected grid view item (e.g., tacos). This is just one example of how grid view template 800 can be used by navigation application 120 to provide access to navigation application functionality to the user.

Grid template 300 can be configured and/or used to present a hierarchy of grid items. Continuing the example above, a first level grid template 300 can present grid items representing broad categories of items (e.g., food, shopping, entertainment, etc.). When a grid item (e.g., food category) is selected from the first level grid template 300, a second level grid template 300 can be presented that presents grid items corresponding to subcategories (e.g., tacos, burgers, pizza, etc.) of the selected category. The hierarchy of grids and/or grid items may include several levels. However, the hierarchy may not exceed configurable number of levels (e.g., 5 levels). This restriction on the number of hierarchy levels can be enforced globally across various templates (e.g., grid template, list template, etc.).

Figure 9:
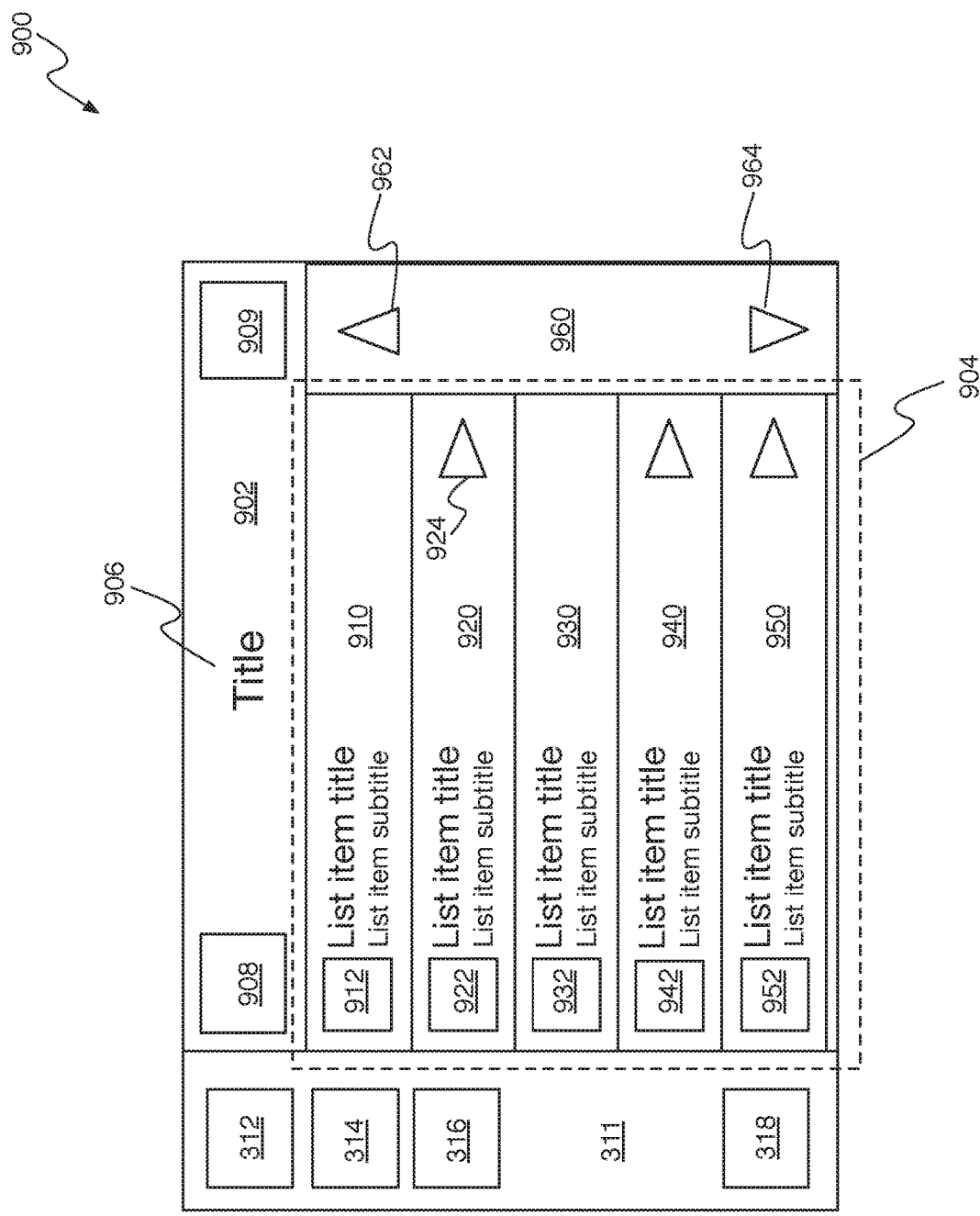
FIG. 9 illustrates an example list template.

FIG. 9 illustrates an example list template 900. For example, list template 900 can correspond to template overlay layer 340. In some implementations, list template 900 can completely cover or obscure the map drawn on base layer 330. For example, list template 900 can be populated with content by navigation application 120 to generate a search results list GUI (or other type of list) for display by navigation system 150. For example, navigation application 120 may cause the search results list GUI to be generated by vehicle UI generator 130 and presented by vehicle system 150 in response to the user entering a search query and/or providing input requesting search results by providing input to a search GUI generated based on one of the search templates described above, for example.

Navigation application 120 can use list template 900 to present a hierarchical list of menu items. List template 900 can include navigation bar 902 and list view 904. Navigation bar 902 can include a title 906, and up to two (2) leading buttons (e.g., button 908) and two (2) trailing buttons (e.g., button 909). Navigation application 120 can customize the appearance of these buttons with icons or text and/or specify functions of navigation application 120 to call when each button is selected. Each item (910, 920, 930, 940, 950, etc.) in the list view 904 can include an icon (912, 922, 932, 942, 952, etc.), title, subtitle, and an optional disclosure indicator (924) indicating the presence of a submenu. The depth of the menu hierarchy may not exceed configurable number of levels (e.g., 5 levels). In some implementations, navigation application 120, vehicle UI generator 130, and/or vehicle system 150 may limit or restrict the total number of items that may be shown in a list based on the current driving context (e.g., vehicle is moving, vehicle is stationary, etc.) of vehicle system 150.

In some implementations, list template 900 can include sidebar 960 that includes graphical elements 962 and/or 964. For example, a user can select graphical elements 962 and/or 964 to scroll up (962) or down (964) through the items listed in list view 904.

Figure 10:
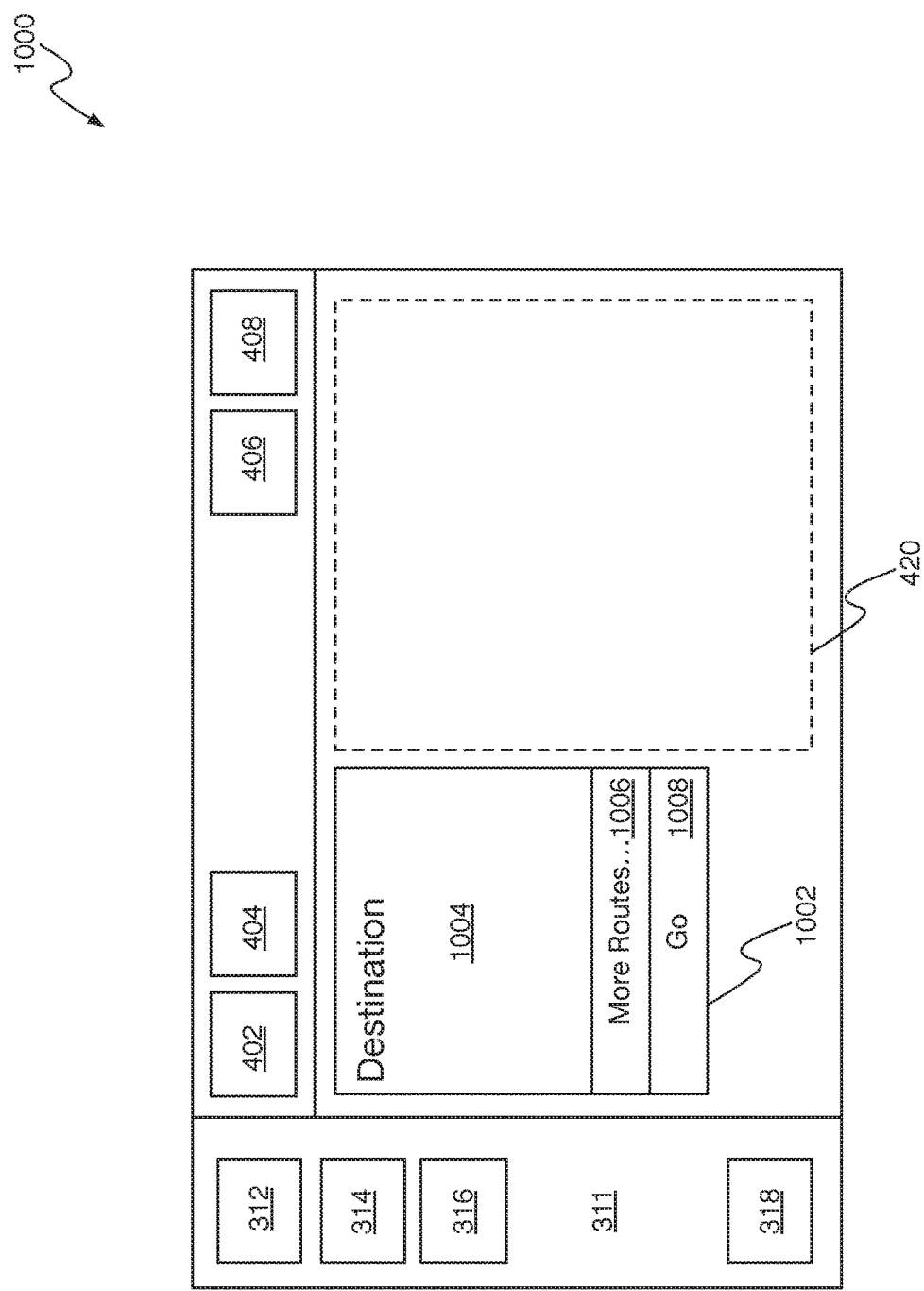
FIG. 10 illustrates an example route preview template.

FIG. 10 illustrates an example route preview template 1000. For example, route preview template 1000 can correspond to template overlay layer 340. Route preview template 1000 can correspond to map template 400. For example, route preview template 1000 can be populated with content by navigation application 120 to generate a route preview GUI for display by navigation system 150. For example, navigation application 120 may cause the route preview GUI to be generated by vehicle UI generator 130 and presented by vehicle system 150 in response to the user selecting a destination (e.g., from a list view, search results, etc.) for which navigation application 120 should generate a route or route preview.

Figure 11:
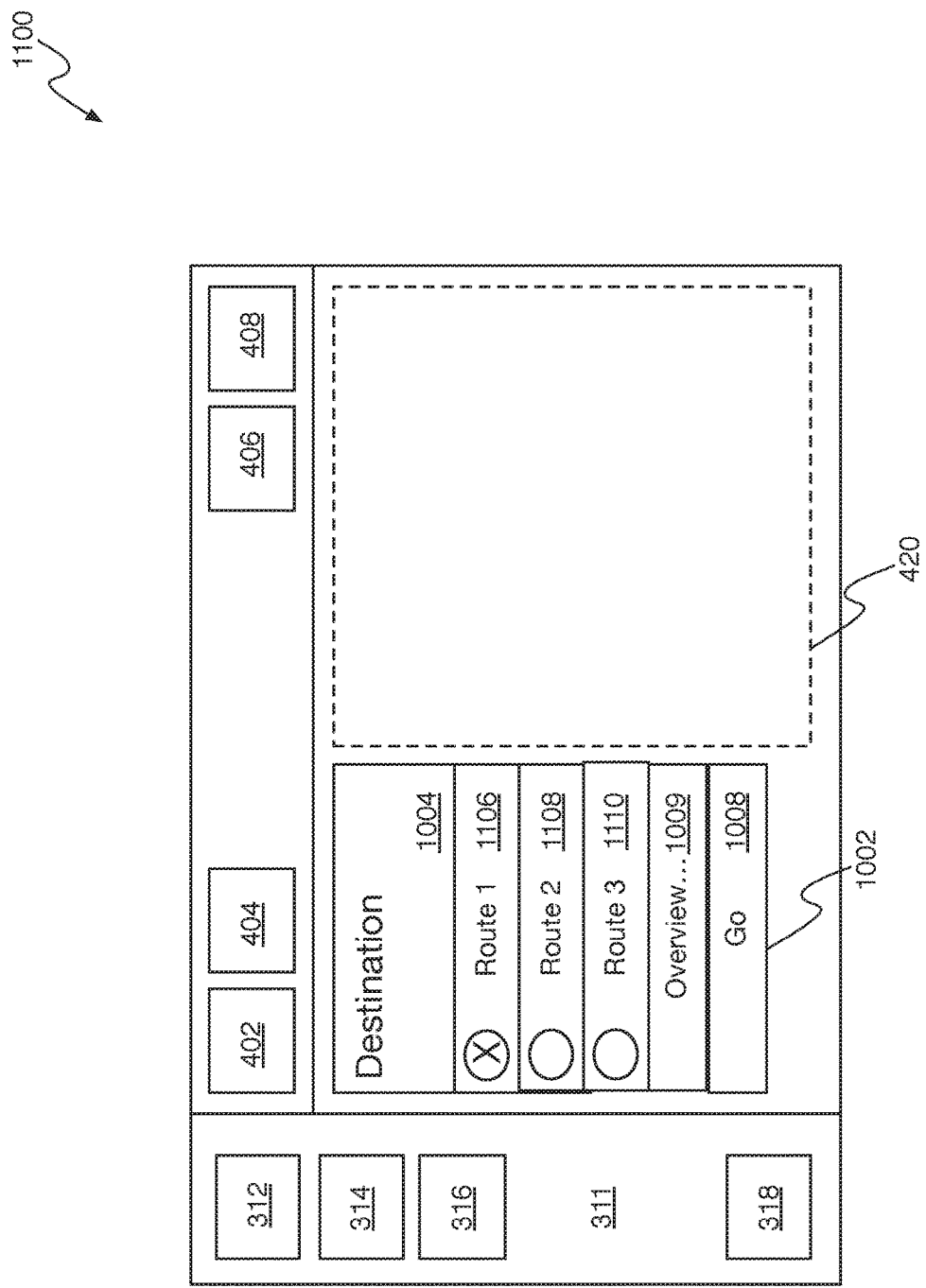
FIG. 11 illustrates another example route preview template where the user has selected to view more routes.

Route preview template 1000 can be configured to present route preview panel 1002. For example, navigation application 120 can configure route preview panel 1002 to present route options for a selected destination. A suggested or preferred route can be shown in panel area 1004. If more than one (1) route is available, a "More Routes . . ." button 1006 will be shown automatically, allowing the user to preview a different route, as illustrated by FIG. 11 below. Navigation application 120 can provide information on each route, including a name, distance, and estimated travel time. Each time the user previews a route (e.g., selects a new or different destination), navigation application 120 can update the base view 330 to provide a visual representation of the route (e.g., in safe area 420). Route preview panel 1002 can include a "Go" button 1008. When the user selects button 1008, navigation application 120 can clear the route preview template 1000 (e.g., by removing route preview panel 1002 and/or presenting map template 400) and begin route guidance to the destination by presenting updated map views, informational elements, alerts, and/or other content as described herein.

FIG. 11 illustrates another example route preview template 1000 where the user has selected to view more routes. Continuing the example described above with reference to FIG. 10, when the user selects button 1006 to view more routes, route preview panel 1002 can present a route list that includes route items 1006, 1108, and/or 1110 that each present information about alternate routes for reaching the selected destination. For example, navigation application 120 can provide information on each route, including a name, distance, and estimated travel time. Each time the user previews a route (e.g., selects a new or different destination), navigation application 120 can update the base view 330 to provide a visual representation (e.g., preview) of the route (e.g., in safe area 420). If more routes than can be shown on route preview panel 1002 are available, a "More Routes . . ." button (not shown in FIG. 11, item 1006 of FIG. 10) will be shown automatically, allowing the user to preview additional routes. Route preview panel 1002 may include an "Overview" button 1009 to cause a detailed view of a selected route to be presented in route preview panel 1002, as illustrated by FIG. 10. Route preview panel 1002 can include a "Go" button 1008. When the user selects button 1008, navigation application 120 can clear the route preview template 1000 (e.g., by removing route preview panel 1002 and/or presenting map template 400) and begin route guidance to the destination by presenting updated map views, informational elements, alerts, and/or other content as described herein.

Figure 12:
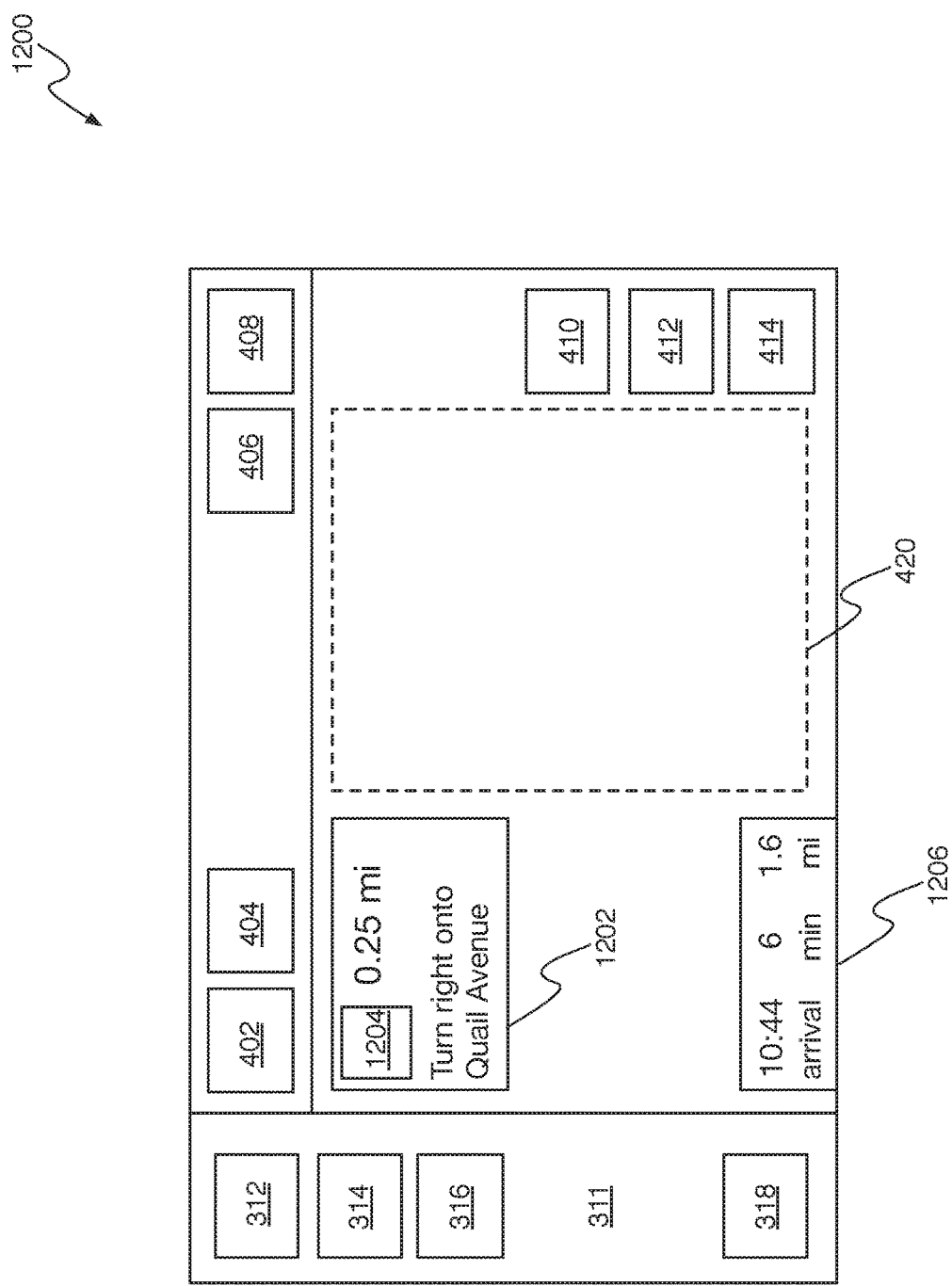
FIG. 12 illustrates an example route guidance template.

FIG. 12 illustrates an example route guidance template 1200. For example, route guidance template 1200 can correspond to template overlay layer 340. Route guidance template 1200 can correspond to map template 400. For example, route guidance template 1200 can be populated with content by navigation application 120 to generate a route guidance GUI for display by navigation system 150. For example, navigation application 120 may cause the route guidance GUI to be generated by vehicle UI generator 130 and presented by vehicle system 150 in response to the user selecting a destination (e.g., from a list view, search results, route preview, etc.) for which navigation application 120 should generate a route or route preview.

Route guidance template 1200 can include route guidance panels 1202 and/or 1206. Navigation application 120 can configure route guidance panel 1202 to show turn-by-turn route guidance. For example, navigation application 120 can provide information describing upcoming maneuvers. Navigation application 120 can configure route guidance panel 1202 to show up to two (2) upcoming maneuvers. Each maneuver presented on route guidance panel 1202 can include maneuver information, such as an icon 1204, text, distance, and/or travel time. Maneuver information can be shown in route guidance panels 1202, in notifications (described below), and may also be sent to vehicles that support the display of maneuver information in their instrument cluster or heads up display. In addition to presenting upcoming maneuvers in route guidance panel 1202, navigation application 120 can configure route guidance panel 1206 to present travel estimates (e.g., arrival time, travel time remaining, miles remaining, etc.) for the overall trip. For example, navigation application 120 can continuously update the travel estimates while the user is traversing the selected route.

Figure 13:
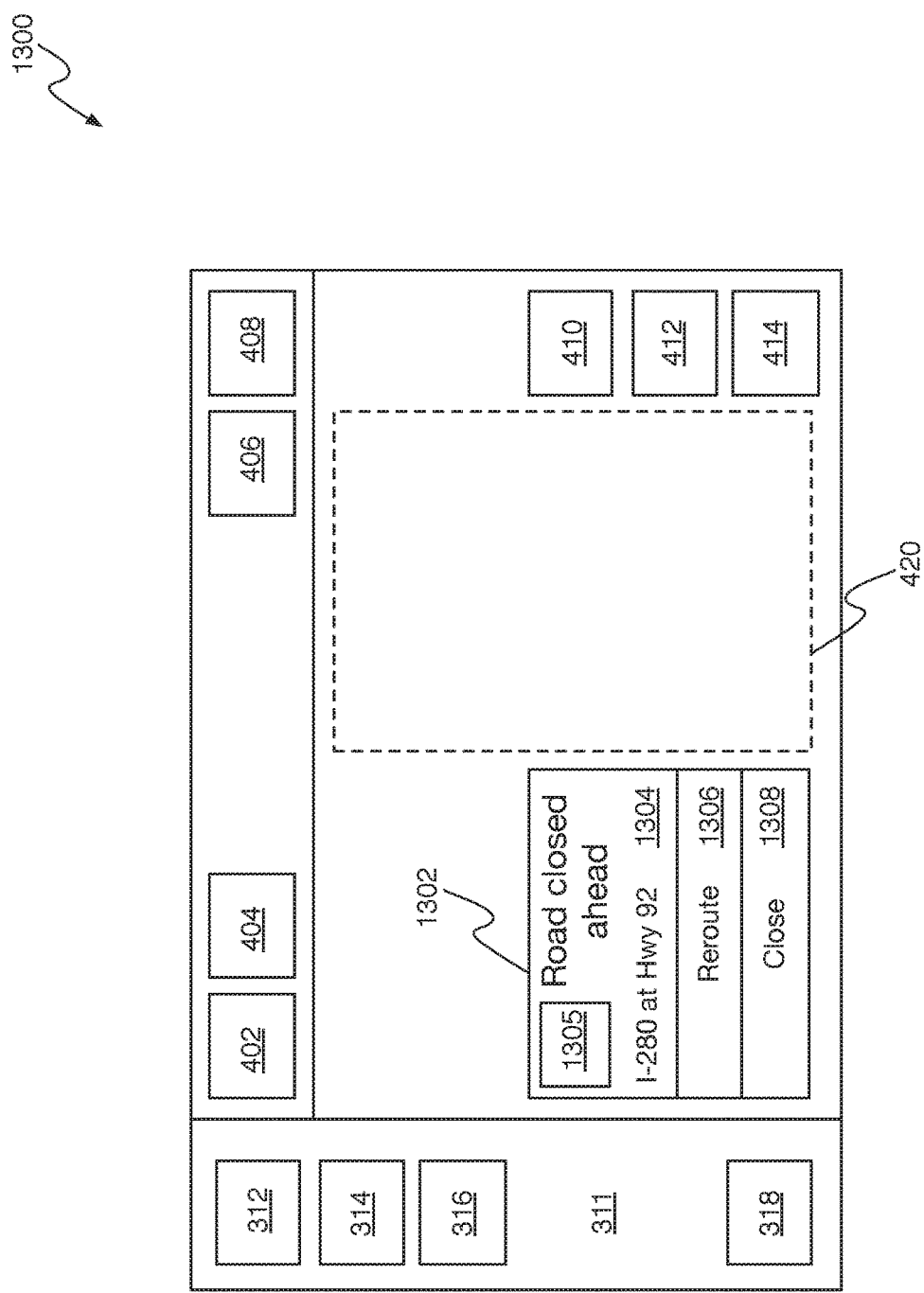
FIG. 13 illustrates an example navigation alert template.

FIG. 13 illustrates an example navigation alert template 1300. For example, navigation alert template 1300 can correspond to template overlay layer 340. Navigation alert template 1200 can correspond to map template 400. For example, navigation alert template 1300 can be populated with content by navigation application 120 to generate a navigation alert GUI for display by navigation system 150. For example, navigation application 120 may cause the navigation alert GUI to be generated by vehicle UI generator 130 and presented by vehicle system 150 in response to detecting a road condition (e.g., accident, road closure, heavy traffic, etc.) that might be of interest to the user.

Figure 14:
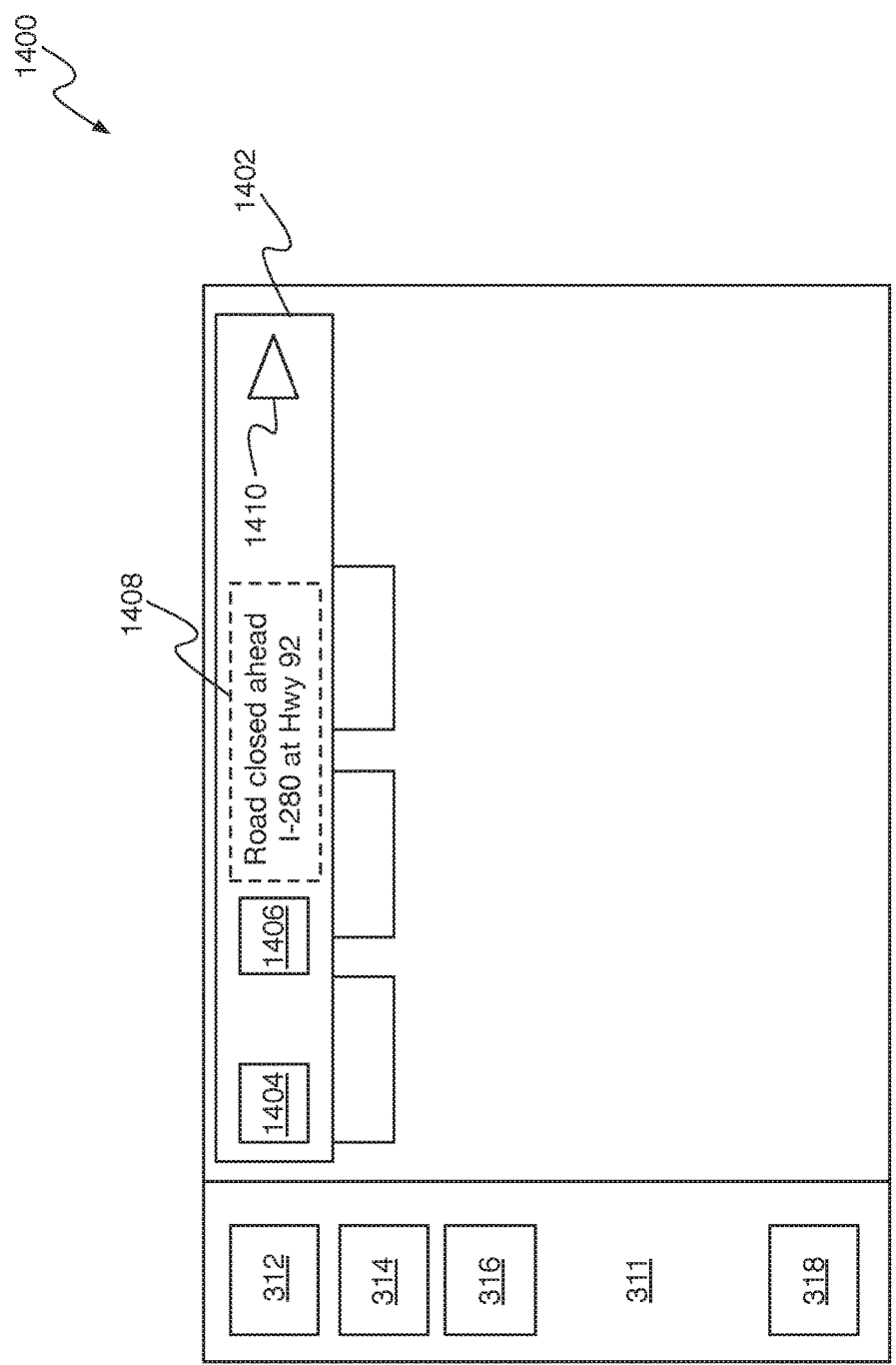
FIG. 14 illustrates an example navigation alert banner notification.

Navigation alert template 1300 can include navigation alert panel 1302 that is overlaid on map view 330. When navigation application 120 is running in the background, high priority alerts can appear over the active app presented by vehicle system 150 and/or vehicle UI module 152, as illustrated by FIG. 14 below. Navigation application 120 can configure navigation alert panel 1302 to present a title (e.g., "Road closed ahead") and a primary action button 1308 (e.g., "close"). Navigation application 120 can configure navigation alert panel 1302 to present an image 1305, subtitle (e.g., "I-280 at Hwy 92"), and secondary action button 1306 (e.g., "reroute"). Navigation application 120 can specify a duration (e.g., 5 seconds, 10 seconds, etc.) for which the alert should be visible before automatically being dismissed.

FIG. 14 illustrates an example navigation banner notification 1400. For example, navigation banner notification 1400 can be presented when navigation application 120 generates a high priority navigation alert while running as a background process. Navigation banner notification 1400 can be presented when navigation application 120 generates and/or updates route maneuvers while running as a background process. While navigation alerts and/or some maneuvers may be automatically dismissed after a period of time (e.g., 5 seconds, 7 seconds, etc.), for updates to the same maneuver (e.g., distance updates), navigation banner notification can remain displayed on the display of vehicle system 150 without being automatically dismissed while the contents are being updated by navigation application 120.

Navigation banner notification 1400 can be generated by vehicle UI generator 130 and presented by vehicle system 150 when navigation application 120 provides information indicating a high priority navigation alert should be displayed on vehicle system 150. Navigation banner notification 1400 can be generated by vehicle UI generator 130 and presented by vehicle system 150 when navigation application 120 provides information indicating a navigation maneuver should be displayed on vehicle system 150. While vehicle UI generator 130 defines the layout and appearance (e.g., color scheme) of navigation banner notification 1400, navigation application 120 can configure the content presented by navigation banner notification 1400. For example, navigation application 120 can provide an image 1404 representing navigation application 120, an image 1406 representing the road condition or maneuver that caused the navigation application 120 to present the navigation banner notification, text 1408 describing the road condition or maneuver, and/or graphical element 1410 for causing vehicle system 150 and/or user device 110 to make navigation application 120 the foreground application or process on vehicle system 150 and/or user device 110.

Figure 15:
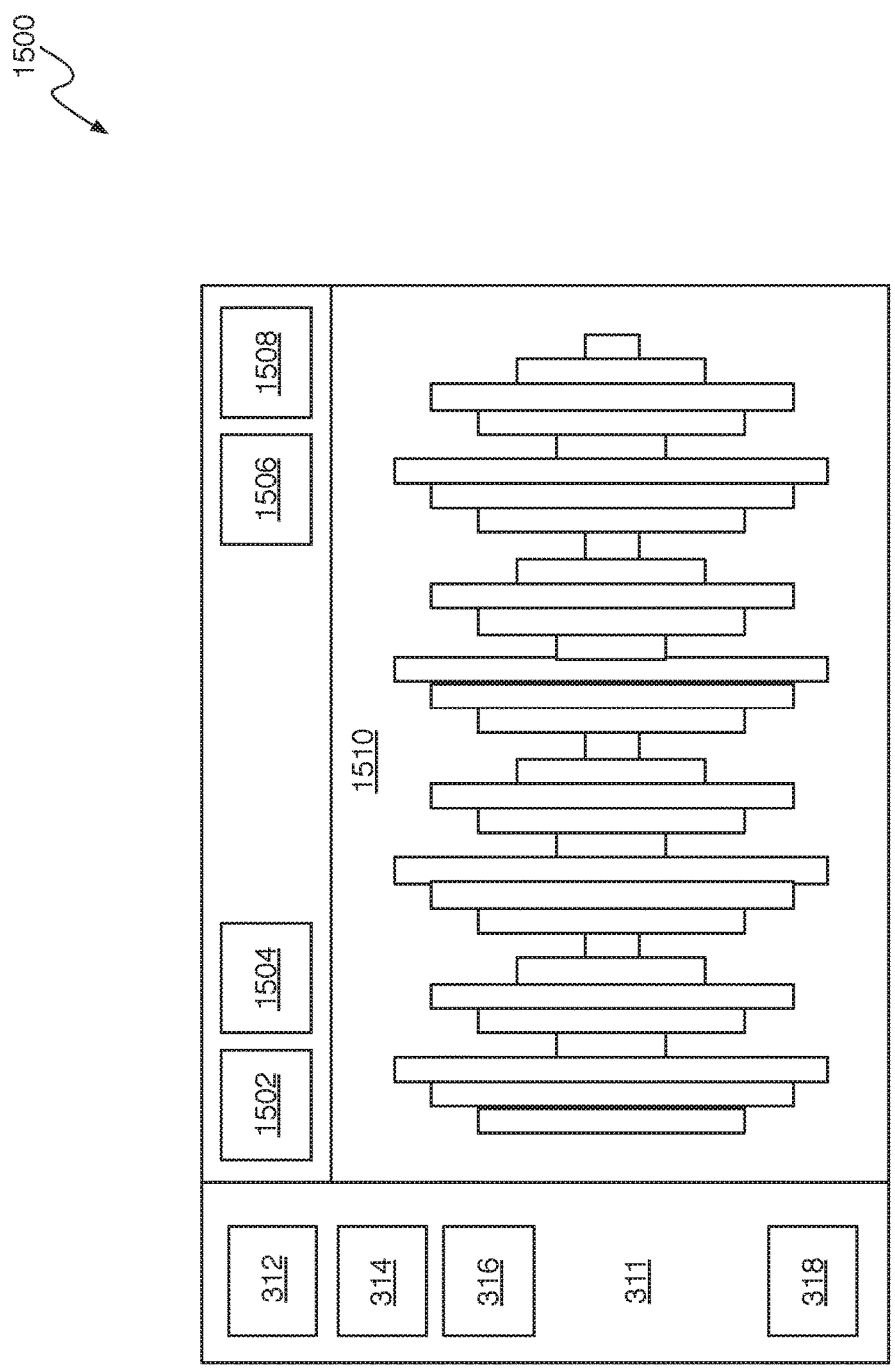
FIG. 15 illustrates an example voice control template.

FIG. 15 illustrates an example voice control template 1500. For example, voice control template 1500 can correspond to template overlay layer 340. In some implementations, voice control template 1500 can completely cover or obscure the map drawn on base layer 330. For example, voice control template 1500 can be populated with content by navigation application 120 to indicate or represent that voice control input is active (e.g., has been activated) for navigation application 120. Navigation application 120 can indicate or represent that voice control input is active for navigation application 120 by configuring voice control template 1500 to present images and or text in area 1510. When a user invokes voice control input for navigation application 120 (e.g., by selecting button 402, 404, 406, or 408), navigation application 120 can cause vehicle UI generator 130 to generate a voice control GUI based on voice control template 1500. Navigation application 120 can configure buttons 1502-1508 to invoke various functions of navigation application 120 (e.g., cancel voice control). Navigation application 120 can configure area 1510 with an image or animation indicating that voice control input is active for navigation application 120.

Figure 16:
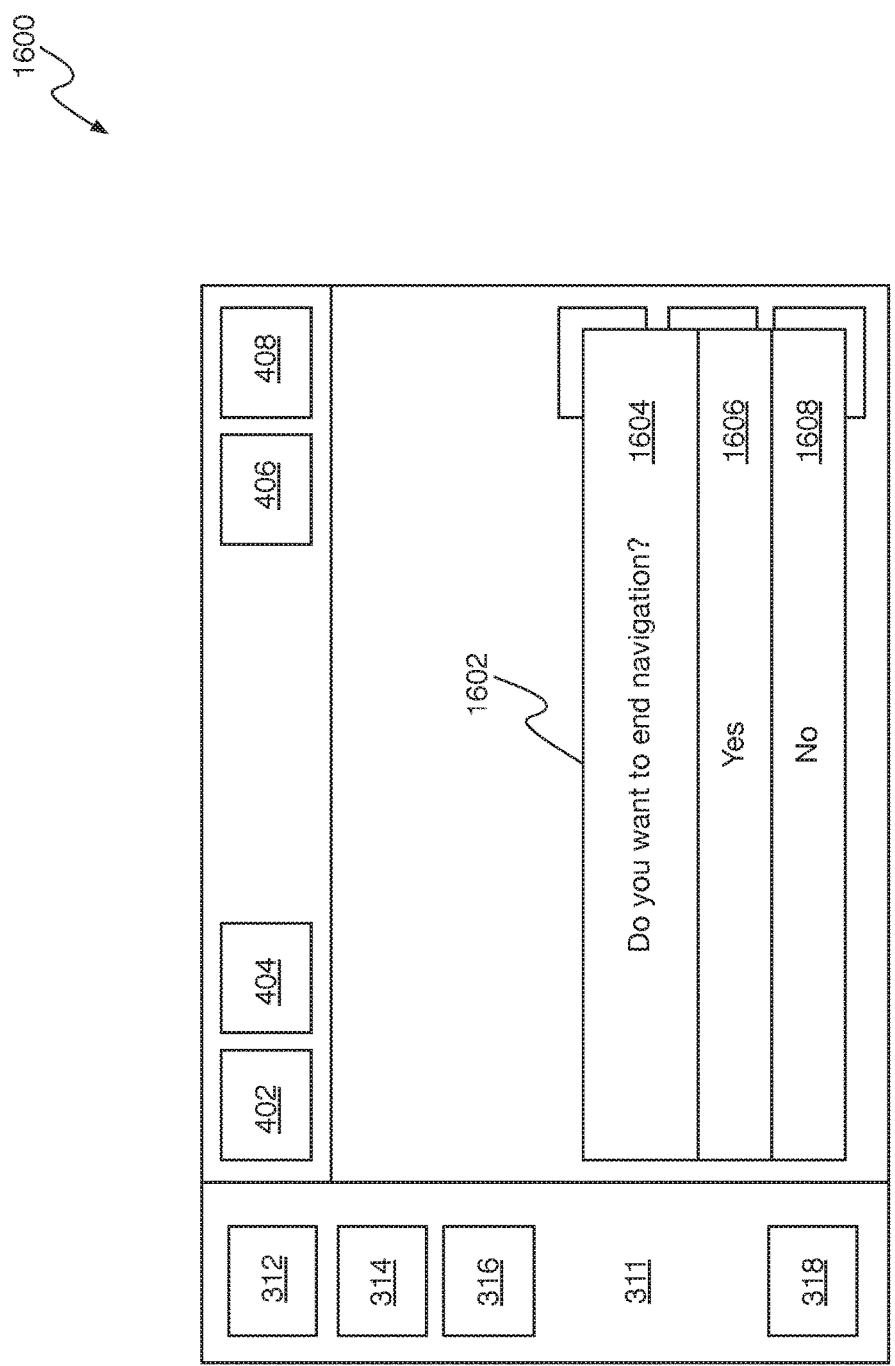
FIG. 16 illustrates an example action sheet alert template.

FIG. 16 illustrates an example action sheet alert template 1600. For example, action sheet alert template 1600 can correspond to template overlay layer 340. For example, action sheet alert template 1600 can be populated with content by navigation application 120 to generate a user action alert GUI for display by navigation system 150. For example, navigation application 120 may cause the user action alert GUI to be generated by vehicle UI generator 130 and presented by vehicle system 150 when navigation application 120 requires input or instruction from the user.

Action sheet alert template 1600 can, for example, include similar features as map template 400, described above. However, action sheet alert template 1600 can also include action alert panel 1602 that is overlaid on map view 330 and/or the map controls of map template 400. Navigation application 120 can configure the content of action alert panel 1602. For example, navigation application 120 can provide text that describes an action required of the user for display in area 1604. Navigation application 120 can configure up to two buttons 1606 and/or 1608 to allow the user to respond to the action alert. Navigation application 120 can configure each button 1606 and/or 1608 to invoke an appropriate function of navigation application 120 when selected by the user.

Figure 17:
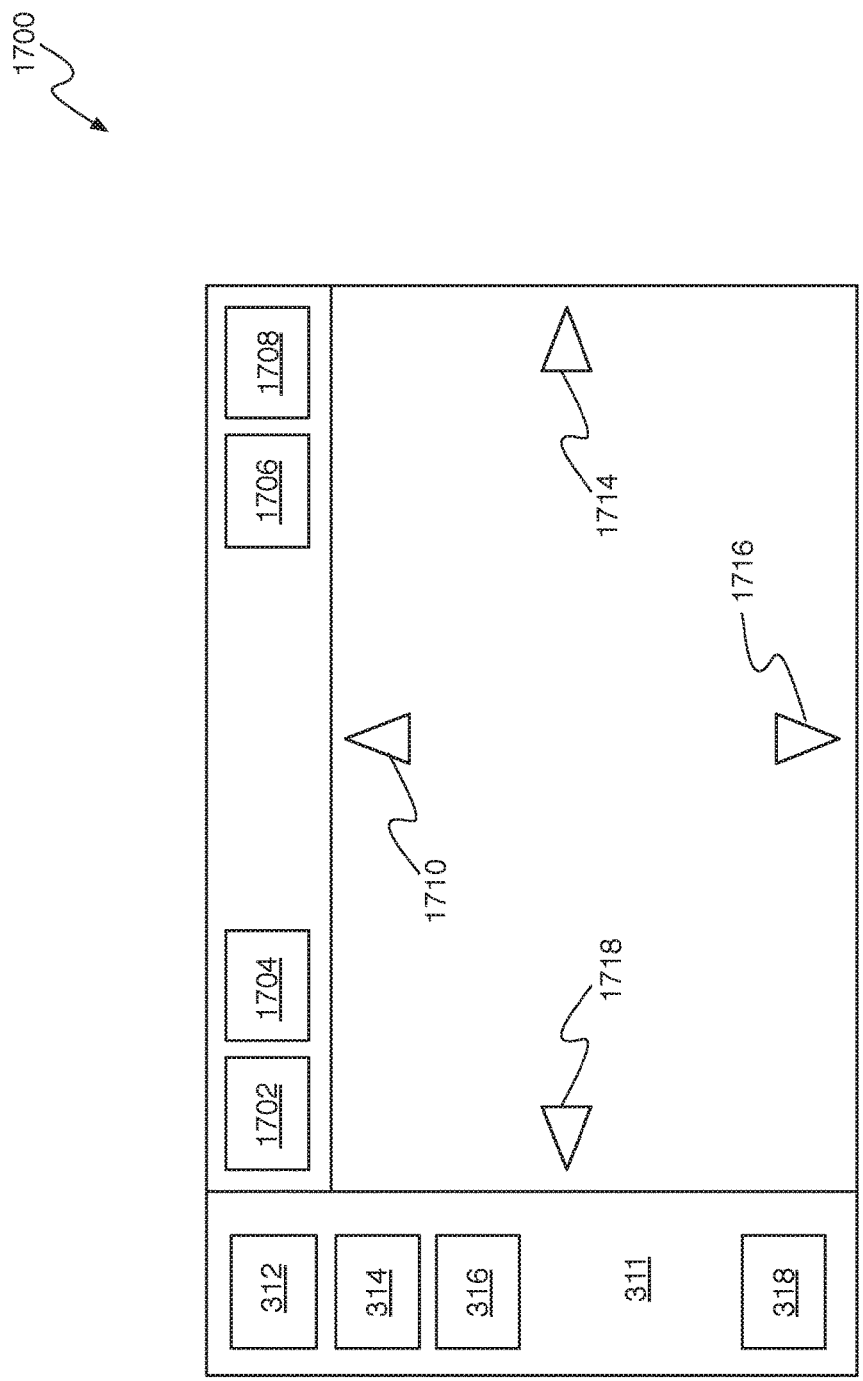
FIG. 17 illustrates an example map panning template.

FIG. 17 illustrates an example map panning template 1700. For example, map panning template 1700 can correspond to template overlay layer 340. Route guidance template 1200 can correspond to map template 400. For example, map panning template 1700 can be populated with content by navigation application 120 to generate a map panning GUI for display by navigation system 150. For example, navigation application 120 may cause the map panning GUI to be generated by vehicle UI generator 130 and presented by vehicle system 150 when navigation application 120 receives user input selecting one of map controls 410, 412, and/or 414 presented by map template 400.

In some implementations, map panning template 1700, can include directional controls 1710 (e.g., up), 1714 (e.g., right), 1716 (e.g., down), and/or 1718 (e.g., left) that, when selected by a user, cause map application 120 pan the map presented by base view 330. For example, the user can provide touch input to areas of a touch sensitive display corresponding to one or more directional controls 1710, 1714, 1716, and/or 1718 to cause navigation application 120 to pan or scroll the map presented by vehicle system 150. The user can manipulate physical controls of vehicle system 150 to provide input to one or more directional controls 1710, 1714, 1716, and/or 1718 to cause navigation application 120 to pan or scroll the map presented by vehicle system 150. The user can manipulate physical controls of vehicle system 150 to provide input to cause navigation application 120 to pan or scroll the map presented by vehicle system 150 without the user of directional controls 1710, 1714, 1716, and/or 1718. For example, if vehicle system 150 has rotary input controllers, user input nudging the controller up/down/left/right (e.g., like a joystick) will be sent as panning events to navigation application 120 through the vehicle UI generator 130 to cause navigation application 120 to pan or scroll the map presented by vehicle system 150. For example, map application 120 can pan, move, or scroll the map by providing new, different, or additional map views corresponding to the map area into which the user has panned or scrolled to vehicle UI generator 130 to present on base view 330.

In some implementations, map panning template 1700 can include buttons 1702, 1704, 1706 and/or 1708. For example, navigation application 120 can configure buttons 1702-1708 to invoke various functions of navigation application 120 (e.g., cancel panning control, destination search, destination browse, etc.).

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 18:
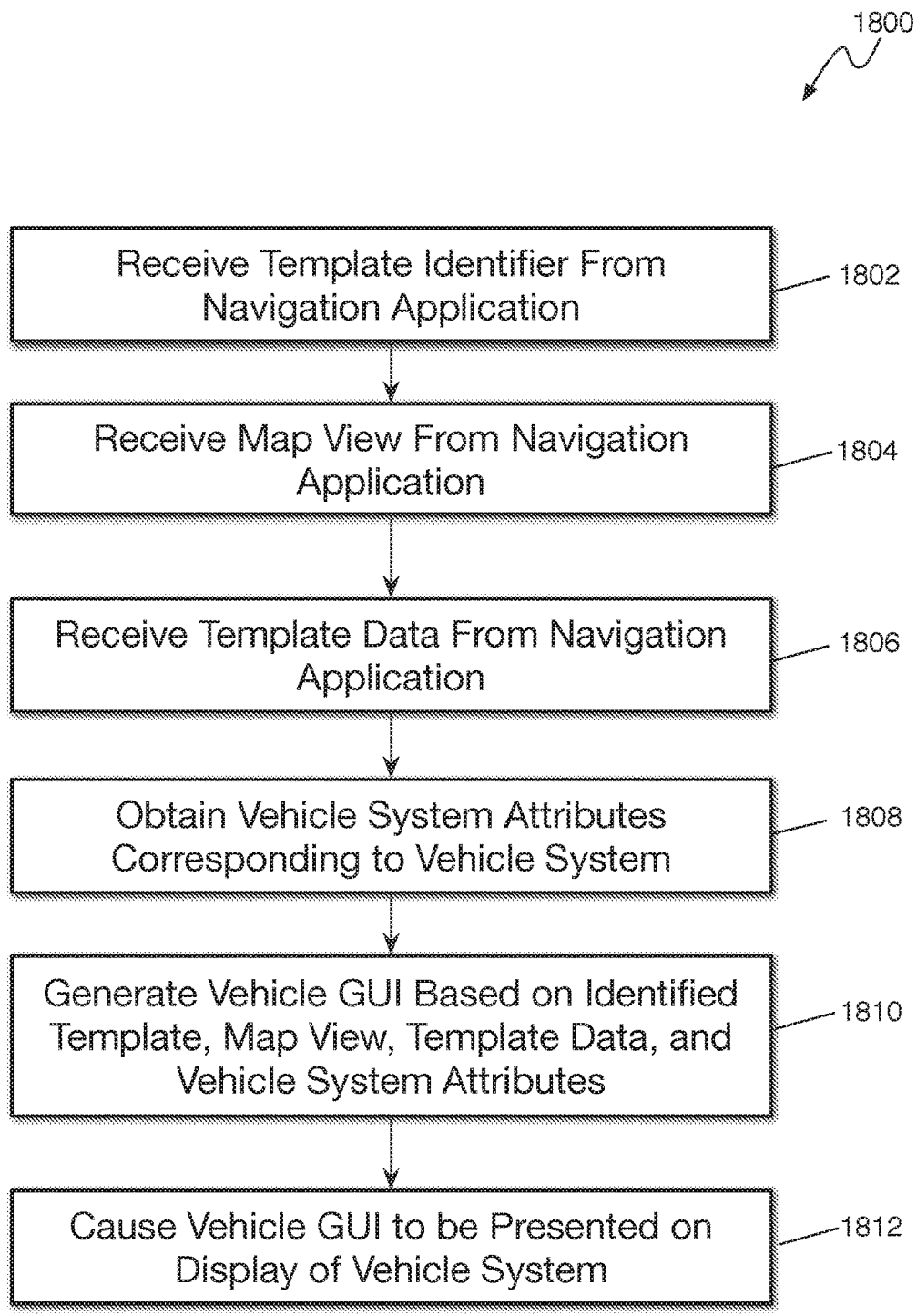
FIG. 18 is flow diagram of an example process for generating navigation user interfaces for third party applications.

FIG. 18 is flow diagram of an example process 1800 for generating navigation user interfaces for third party applications. For example, process 1800 can be performed by user device 110 to generate graphical user interfaces for third party navigation applications, as described above. Process 1800 can be performed by the operating system of user device 110, an application framework provided by user device 110, a software library provided by user device 110, or some other first party software module configured on user device 110.

At step 1802, user device 110 can receive a template identifier from navigation application 120. For example, vehicle UI generator 130 can receive the template identifier from navigation application 120. For example, navigation application 120 can be a third-party navigation application installed and/or running on user device 110. Navigation application 120 can include instructions and/or logic for determining which graphical user interfaces to present at different times and in response to different inputs during its operation. Navigation application 120 can determine or select the appropriate navigation GUI template based on the current operating context of navigation application 120 and the graphical user interface necessary to present features appropriate to the current operating context. Navigation application 120 can determine a template identifier (e.g., or API) associated with the selected navigation GUI template. Navigation application 120 can send the template identifier to vehicle UI generator 130 in a request to generate a navigation GUI for navigation application 120 for display on vehicle system 150.

At step 1804, user device 110 can receive map views from navigation application 120. For example, vehicle UI generator 130 can receive one or more map views (e.g., map images, raster tiles, raster images, etc.) from navigation application 120. Navigation application 120 can generate or obtain map views that present map features (e.g., roads, buildings, topology, etc.) to a geographic region. Navigation application 120 can generate or obtain map views that include graphical representations of destinations and/or navigation routes. Navigation application 120 can send the map views to vehicle UI generator 130 in a request to generate a navigation GUI for navigation application 120 for display on vehicle system 150.

At step 1806, user device 110 can receive template data from navigation application 120. For example, vehicle UI generator 130 can receive template data that defines the content and control interactions (e.g., functions to call when a button or other element is selected) for the identified template from navigation application 120. Navigation application 120 can include instructions and/or logic for determining which graphical user interfaces to present at different times and in response to different inputs during its operation. Navigation application 120 can determine the content and/or control elements to send to vehicle UI generator 130 based on the current operating context of navigation application 120 and the graphical user interface necessary to present features appropriate to the current operating context. Navigation application 120 can send the template data to vehicle UI generator 130 in a request to generate a navigation GUI for navigation application 120 for display on vehicle system 150.

At step 1808, user device 110 can obtain vehicle system attributes corresponding to vehicle system 150. For example, vehicle UI generator 130 can obtain vehicle system attributes (e.g., specifications, capabilities, etc.) directly from vehicle system 150 or from local storage on user device 110. For example, when user device 110 initially connects to vehicle system 150, vehicle UI generator 130 can obtain information describing the vehicle system attributes from vehicle system 150 and store information describing the vehicle system attributes locally on user device 110. Thus, when vehicle UI generator 130 generates subsequent GUIs, vehicle UI generator 130 can obtain the vehicle attribute information from local storage instead of requesting the information from vehicle system 150.

At step 1810, user device 110 can generate a navigation graphical user interface for presentation on vehicle system 150 based on the identified template, the map views, the template data, and/or the vehicle system attributes. For example, vehicle UI generator 130 can obtain a GUI template corresponding to the template identifier received from navigation application 120. Vehicle UI generator 130 can populate the GUI template with the template data received from navigation application 120 to generate the template overlay layer 340. Vehicle UI generator 130 can generate base view layer 330 based on the map views received from navigation application 120. Vehicle UI generator 130 can generate the navigation graphical user interface by combining the template overlay layer 340 with the base view layer 330 and the system UI layer 310, as described above with reference to FIG. 3. Vehicle UI generator 130 can adjust the generated navigation GUI according to the vehicle system attributes. For example, vehicle UI generator 130 can adjust the color scheme, size, control interface, and/or other attributes of the generated navigation GUI based on the vehicle system attributes in order to optimize the generated navigational GUI for presentation by vehicle system 150.

At step 1812, user device 110 can cause vehicle system 150 to present the generated navigation GUI on a display of vehicle system 150. For example, vehicle UI generator can cause vehicle system 150 to present the generated navigation GUI by sending the navigation GUI to vehicle system 140. Vehicle system 150 can present the generated navigation GUI on a display of vehicle system 150 in response to receiving the navigation GUI. Vehicle UI generator 130 can send the generated navigation GUI to vehicle system 150 through a wired or wireless connection between user device 110 and vehicle system 150.

Figure 19:
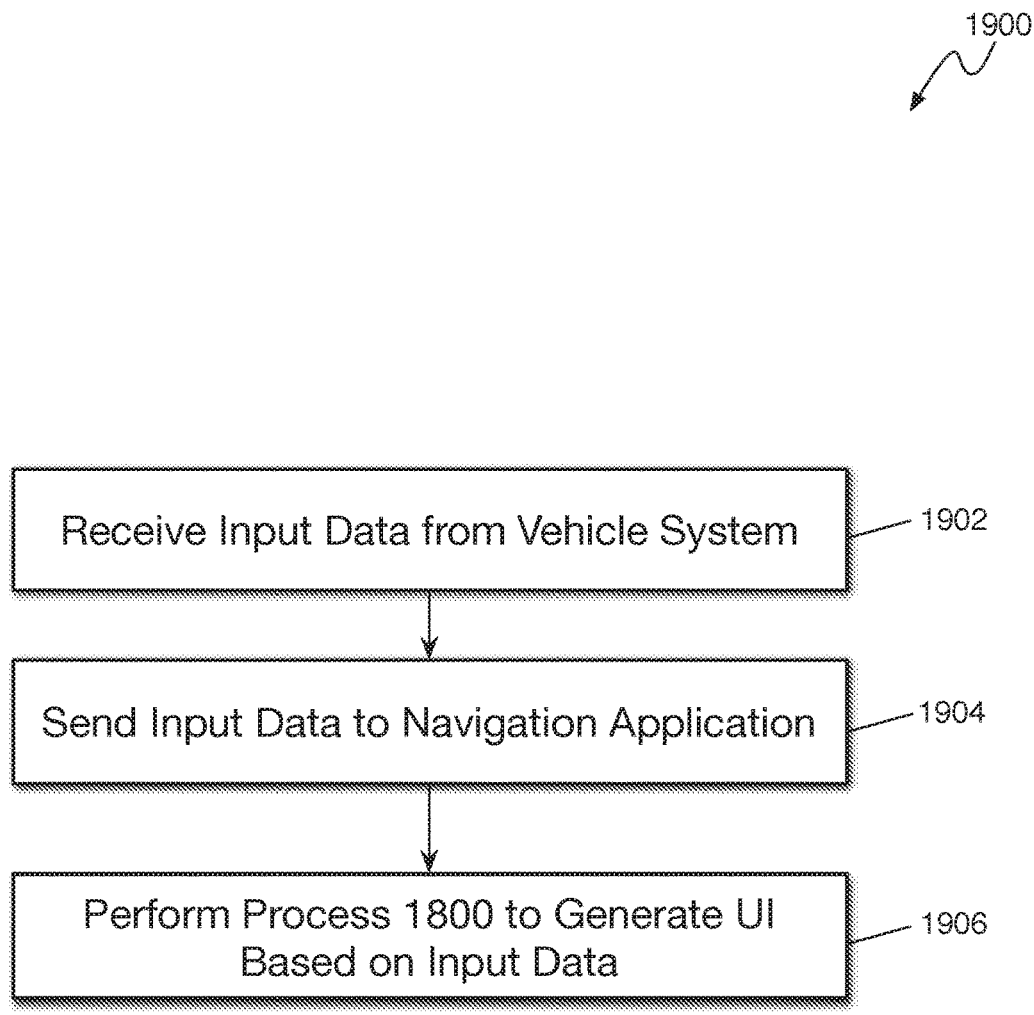
FIG. 19 is a flow diagram of an example process for processing user input to navigation user interfaces generated for third party applications.

FIG. 19 is a flow diagram of an example process 1900 for processing user input to navigation user interfaces generated for third party applications. For example, process 1900 can be performed by user device 110 to process user input to graphical user interfaces generated for third party navigation applications and presented on vehicle system 150, as described above. Process 1800 can be performed by the operating system of user device 110, an application framework provided by user device 110, a software library provided by user device 110, or some other first party software module configured on user device 110.

At step 1902, user device 110 can receive input data from vehicle system 150. For example, when a user selects a graphical element (e.g., button, list item, directional control, or other selectable graphical element) presented on a navigation GUI generated by vehicle UI generator 130 and presented on vehicle system 150, vehicle system 150 can send input data to vehicle UI generator 130 that describes the received user input. For example, the input data can indicate an identifier for the selected graphical element. The input data can indicate a location on the navigation GUI where the user input was received.

At step 1904, user device can send input data to navigation application 102. For example, when vehicle UI generator 130 receives the input data from vehicle system 150, vehicle UI generator 130 can determine an appropriate message to send to navigation application 102 and/or an appropriate API of navigation application 102 to call. For example, when navigation application 102 sends a request to vehicle UI generator 130 to generate a navigation GUI for display on vehicle system 150, navigation application 120 can specify or register an API, input handler function, or other type of callback routine for vehicle UI generator 130 to call for each selectable graphical element (e.g., button, list item, directional control, etc.) presented on the generated navigation GUI. When vehicle UI generator 130 receives user input data indicating that a user has selected a graphical element on navigation GUI, vehicle UI generator 130 can call the callback routine, function, or API of navigation application 120 associated with the selected graphical element. In some implementations, vehicle UI generator 130 can send input data as parameters to the callback routine. In some implementations, vehicle UI generator 130 can send input data in a message to navigation application 102. For example, the message can indicate which graphical element was selected by the user of vehicle system 150.

At step 1906, user device 110 can perform process 1800 to generate a new GUI based on the input data. For example, navigation application 102 can process the input data and determine a new graphical user interface to present on vehicle system 150 based on the received input data. Navigation application 102 can then send a template identifier, map view, and/or template data to vehicle UI generator 130 so that vehicle UI generator 130 can generate a new navigation GUI for presentation by vehicle system 150 in response to the received input data.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Example System Architecture

Figure 20:
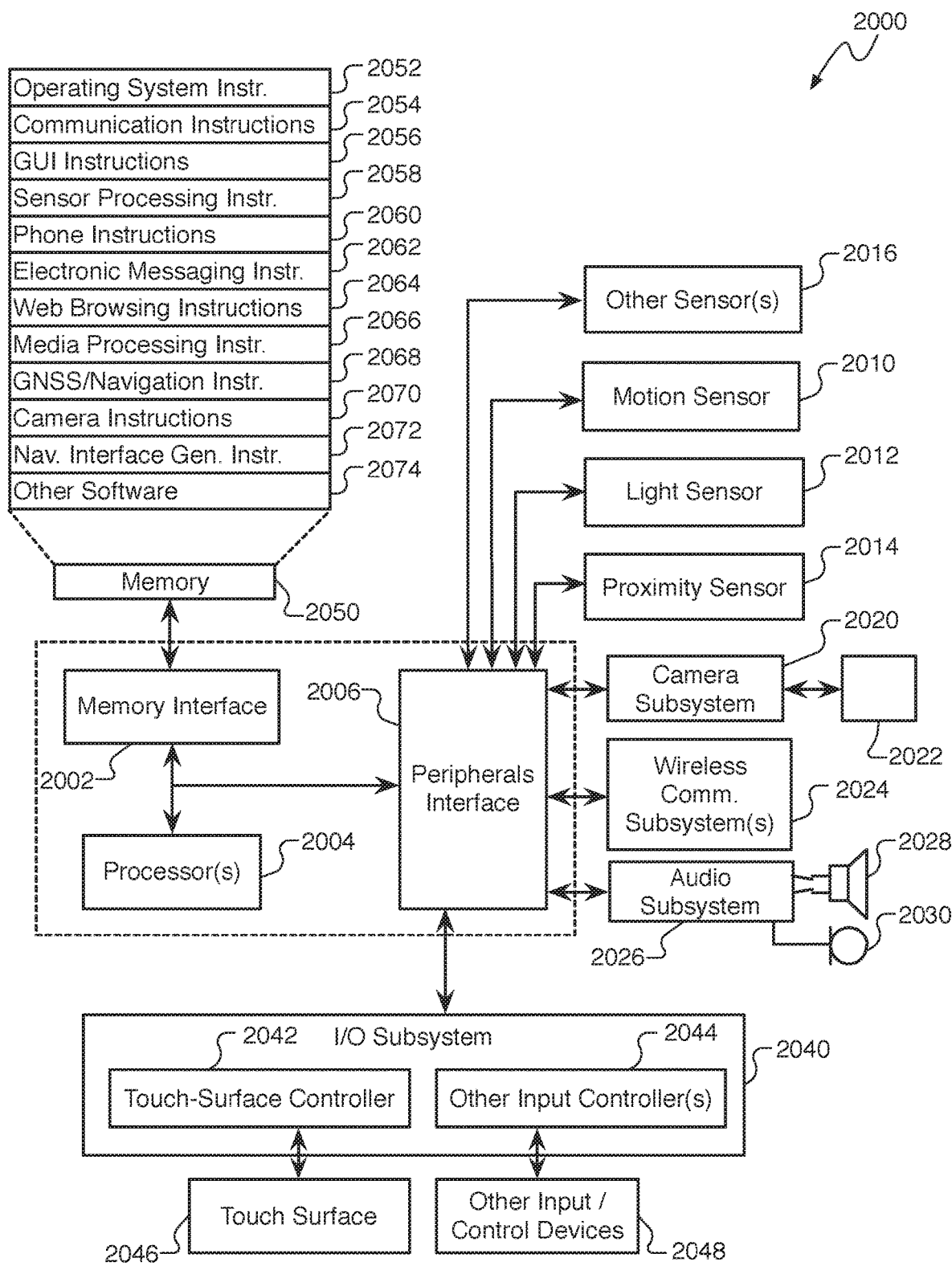
FIG. 20 is a block diagram of an example computing device that can implement the features and processes of FIGS. 1-19.

FIG. 20 is a block diagram of an example computing device 2000 that can implement the features and processes of FIGS. 1-19. The computing device 2000 can include a memory interface 2002, one or more data processors, image processors and/or central processing units 2004, and a peripherals interface 2006. The memory interface 2002, the one or more processors 2004 and/or the peripherals interface 2006 can be separate components or can be integrated in one or more integrated circuits. The various components in the computing device 2000 can be coupled by one or more communication buses or signal lines.

Sensors, devices, and subsystems can be coupled to the peripherals interface 2006 to facilitate multiple functionalities. For example, a motion sensor 2010, a light sensor 2012, and a proximity sensor 2014 can be coupled to the peripherals interface 2006 to facilitate orientation, lighting, and proximity functions. Other sensors 2016 can also be connected to the peripherals interface 2006, such as a global navigation satellite system (GNSS) (e.g., GPS receiver), a temperature sensor, a biometric sensor, magnetometer or other sensing device, to facilitate related functionalities.

A camera subsystem 2020 and an optical sensor 2022, e.g., a charged coupled device (CCD) or a complementary metal-oxide semiconductor (CMOS) optical sensor, can be utilized to facilitate camera functions, such as recording photographs and video clips. The camera subsystem 2020 and the optical sensor 2022 can be used to collect images of a user to be used during authentication of a user, e.g., by performing facial recognition analysis.

Communication functions can be facilitated through one or more wireless communication subsystems 2024, which can include radio frequency receivers and transmitters and/or optical (e.g., infrared) receivers and transmitters. The specific design and implementation of the communication subsystem 2024 can depend on the communication network(s) over which the computing device 2000 is intended to operate. For example, the computing device 2000 can include communication subsystems 2024 designed to operate over a GSM network, a GPRS network, an EDGE network, a Wi-Fi or WiMax network, and a Bluetooth™ network. In particular, the wireless communication subsystems 2024 can include hosting protocols such that the device 100 can be configured as a base station for other wireless devices.

An audio subsystem 2026 can be coupled to a speaker 2028 and a microphone 2030 to facilitate voice-enabled functions, such as speaker recognition, voice replication, digital recording, and telephony functions. The audio subsystem 2026 can be configured to facilitate processing voice commands, voice printing and voice authentication, for example.

The I/O subsystem 2040 can include a touch-surface controller 2042 and/or other input controller(s) 2044. The touch-surface controller 2042 can be coupled to a touch surface 2046. The touch surface 2046 and touch-surface controller 2042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 2046.

The other input controller(s) 2044 can be coupled to other input/control devices 2048, such as one or more buttons, rocker switches, thumb-wheel, infrared port, USB port, and/or a pointer device such as a stylus. The one or more buttons (not shown) can include an up/down button for volume control of the speaker 2028 and/or the microphone 2030.

In one implementation, a pressing of the button for a first duration can disengage a lock of the touch surface 2046; and a pressing of the button for a second duration that is longer than the first duration can turn power to the computing device 2000 on or off. Pressing the button for a third duration can activate a voice control, or voice command, module that enables the user to speak commands into the microphone 2030 to cause the device to execute the spoken command. The user can customize a functionality of one or more of the buttons. The touch surface 2046 can, for example, also be used to implement virtual or soft buttons and/or a keyboard.

In some implementations, the computing device 2000 can present recorded audio and/or video files, such as MP3, AAC, and MPEG files. In some implementations, the computing device 2000 can include the functionality of an MP3 player, such as an iPod™.

The memory interface 2002 can be coupled to memory 2050. The memory 2050 can include high-speed random-access memory and/or non-volatile memory, such as one or more magnetic disk storage devices, one or more optical storage devices, and/or flash memory (e.g., NAND, NOR). The memory 2050 can store an operating system 2052, such as Darwin, RTXC, LINUX, UNIX, OS X, WINDOWS, or an embedded operating system such as VxWorks.

The operating system 2052 can include instructions for handling basic system services and for performing hardware dependent tasks. In some implementations, the operating system 2052 can be a kernel (e.g., UNIX kernel). In some implementations, the operating system 2052 can include instructions for performing voice authentication. For example, operating system 2052 can implement the third-party navigation GUI generation features as described with reference to FIGS. 1-19.

The memory 2050 can also store communication instructions 2054 to facilitate communicating with one or more additional devices, one or more computers and/or one or more servers. The memory 2050 can include graphical user interface instructions 2056 to facilitate graphic user interface processing; sensor processing instructions 2058 to facilitate sensor-related processing and functions; phone instructions 2060 to facilitate phone-related processes and functions; electronic messaging instructions 2062 to facilitate electronic-messaging related processes and functions; web browsing instructions 2064 to facilitate web browsing-related processes and functions; media processing instructions 2066 to facilitate media processing-related processes and functions; GNSS/Navigation instructions 2068 to facilitate GNSS and navigation-related processes and instructions; and/or camera instructions 2070 to facilitate camera-related processes and functions.

The memory 2050 can store other software instructions 2072 to facilitate other processes and functions, such as the third-party navigation GUI generation processes and functions as described with reference to FIGS. 1-19.

The memory 2050 can also store other software instructions 2074, such as web video instructions to facilitate web video-related processes and functions; and/or web shopping instructions to facilitate web shopping-related processes and functions. In some implementations, the media processing instructions 2066 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 2050 can include additional instructions or fewer instructions. Furthermore, various functions of the computing device 2000 can be implemented in hardware and/or in software, including in one or more signal processing and/or application specific integrated circuits.

What is claimed is:

1. A method comprising:
    receiving, by a graphical user interface (GUI) generator on a mobile device, a first template identifier from a navigation application executing on the mobile device;
    obtaining, by the GUI generator, a first template corresponding to the first template identifier;
    receiving, by the GUI generator, a first map view from the navigation application;
    receiving, by the GUI generator, a first template configuration data for the first template from the navigation application, the first template configuration data including a first set of template attribute values associated with a plurality of template attributes;
    obtaining, by the GUI generator, vehicle system attributes corresponding to a vehicle system;
    adjusting, by the GUI generator, the first template configuration data of the template based on a second set of template attribute values derived from the vehicle system attributes;
    generating, by the GUI generator, a first GUI for the navigation application for presentation by the vehicle system based on the first template, the map view, the adjusted first template configuration data for the first template, and the vehicle system attributes; and
    causing, by the GUI generator, the first GUI to be presented on a first display of the vehicle system.

2. The method of claim 1, wherein the GUI generator is provided by the operating system of the mobile device, wherein the GUI generator is provided by a first application source, and the navigation application is a third-party navigation application provided by a second application source that is distinct from the first application source.

3. The method of claim 1, wherein the navigation application selects the first template identifier based on a particular navigation context of the navigation application, wherein the first GUI generated by the GUI generator for the navigation application is different than a navigation GUI that would be presented by the navigation application on a second display of the mobile device in the particular navigation context, further comprising:
    adjusting, by the GUI generator, the first template configuration data based on the navigation context; and
    generating the first GUI based on the map view, the vehicle system attributes, and the adjusted first template configuration data.

4. The method of claim 1, further comprising:
    receiving, by the GUI generator, input data from the vehicle system;
    sending, by the GUI generator, the input data to the navigation application:
    receiving, by the GUI generator, a second template identifier and a second template configuration data from the navigation application;
    in response to receiving the second template identifier and the second template configuration data, generating, by the GUI generator, a second GUI for the navigation application for presentation by the vehicle system based on the second identifier and the second template configuration data; and
    causing, by the GUI generator, the second GUI to be presented on the first display of the vehicle system.

5. The method of claim 1, wherein the first GUI is comprised of a plurality of GUI layers and where a first layer of the plurality of layers is generated by an operating system of the mobile device, a second layer of the plurality of layers is generated by the navigation application, and a third layer of the plurality of layers is generated by the operating system of the mobile device, and wherein generating the first GUI comprises:
    rendering the third layer over the second layer; and
    rendering the second layer and third layer over the first layer.

6. The method of claim 1, wherein the GUI generator imposes restrictions on the GUIs requested by the navigation application based on the operating context of the vehicle system.

7. The method of claim 1, wherein the GUI content includes a plurality of text variants each having a different character length, further comprising:
    determining, by the GUI generator, a first graphical element of the first GUI is to be populated by a text variant of the plurality of text variants;
    determining, by the GUI generator, a display size associated with the first graphical element; and
    selecting, by the GUI generator, a first text variant of the plurality of text variants based on the determined display size; and
    populating, by the GUI generator, the first graphical element with the first text variant.

8. The method of claim 7, further comprising:
    selecting the largest text variant of the plurality of text variants that will fit within the determined display size; and
    populating, by the GUI generator, the first graphical element with the first text variant.

9. The method of claim 1, further comprising:
    receiving, by the GUI generator, from the vehicle system, an amount of light detected by a light sensor of the vehicle system; and
    adjusting, by the GUI generator, the first template configuration data based on the received amount of light.

10. The method of claim 1, wherein the template attributes include a display size of the first template, further comprising:
    determining, by the GUI generator, a display size of the first display of the vehicle system;
    obtaining, by the GUI generator, the first template specified by the navigation application; and
    adjusting, by the GUI generator, the first template configuration data based on the determined display size of the first display.

11. The method of claim 1, wherein the plurality of template attributes includes a vehicle display screen size, a vehicle display color scheme, a vehicle display resolution, a graphical element display size, and a graphical element layout.

12. A non-transitory computer readable medium including one or more sequences of instructions that, when executed by one or more processors, cause the one or more processors to perform operations comprising:
    receiving, by a graphical user interface (GUI) generator on a mobile device, a first template identifier from a navigation application executing on the mobile device:
    obtaining, by the GUI generator, a first template corresponding to the first template identifier;

receiving, by the GUI generator, a first map view from the navigation application;

receiving, by the GUI generator, a first template configuration data for the first template from the navigation application, the first template configuration data including a first set of template attribute values associated with a plurality of template attributes;

obtaining, by the GUI generator, vehicle system attributes corresponding to a vehicle system;

adjusting, by the GUI generator, the first template configuration data of the template based on a second set of template attribute values derived from the vehicle system attributes;

generating, by the GUI generator, a first GUI for the navigation application for presentation by the vehicle system based on the first template, the map view, the adjusted first template configuration data for the first template, and the vehicle system attributes; and causing, by the GUI generator, the first GUI to be presented on a first display of the vehicle system.

13. The non-transitory computer readable medium of claim 12, wherein the navigation application selects the first template identifier based on a particular navigation context of the navigation application, the first GUI generated by the GUI generator for the navigation application is different than a navigation GUI that would be presented by the navigation application on a second display of the mobile device in the particular navigation context, and wherein the instructions cause the one or more processors to perform operations comprising:

adjusting, by the GUI generator, the first template configuration data based on the navigation context; and generating the first GUI based on the map view, the vehicle system attributes, and the adjusted first template configuration data.

14. The non-transitory computer readable medium of claim 12, wherein the instructions cause the one or more processors to perform operations comprising:

receiving, by the GUI generator, input data from the vehicle system;

sending, by the GUI generator, the input data to the navigation application;

receiving, by the GUI generator, a second template identifier and a second template configuration data from the navigation application;

in response to receiving the second template identifier and the second template configuration data, generating, by the GUI generator, a second GUI for the navigation application for presentation by the vehicle system based on the second identifier and the second template configuration data; and causing, by the GUI generator, the second GUI to be presented on the first display of the vehicle system.

15. The non-transitory computer readable medium of claim 12, wherein the first GUI is comprised of a plurality of GUI layers and where a first layer of the plurality of layers is generated by an operating system of the mobile device, a second layer of the plurality of layers is generated by the navigation application, and a third layer of the plurality of layers is generated by the operating system of the mobile device, and wherein generating the first GUI comprises:

rendering the third layer over the second layer; and rendering the second layer and third layer over the first layer.

16. The non-transitory computer readable medium of claim 12, wherein the GUI generator imposes restrictions on the GUIs requested by the navigation application based on the operating context of the vehicle system.

17. A system comprising:

one or more processors; and a non-transitory computer readable medium including one or more sequences of instructions that, when executed by the one or more processors, cause the one or more processors to perform operations comprising:

receiving, by a graphical user interface (GUI) generator on a mobile device, a first template identifier from a navigation application executing on the mobile device;

obtaining, by the GUI generator, a first template corresponding to the first template identifier;

receiving, by the GUI generator, a first map view from the navigation application;

receiving, by the GUI generator, a first template configuration data for the first template from the navigation application, the first template configuration data including a first set of template attribute values associated with a plurality of template attributes;

obtaining, by the GUI generator, vehicle system attributes corresponding to a vehicle system;

adjusting, by the GUI generator, the first template configuration data of the template based on a second set of template attribute values derived from the vehicle system attributes;

generating, by the GUI generator, a first GUI for the navigation application for presentation by the vehicle system based on the first template, the map view, the adjusted first template configuration data for the first template, and the vehicle system attributes; and causing, by the GUI generator, the first GUI to be presented on a first display of the vehicle system.

18. The system of claim 17, wherein the navigation application selects the first template identifier based on a particular navigation context of the navigation application, the first GUI generated by the GUI generator for the navigation application is different than a navigation GUI that would be presented by the navigation application on a second display of the mobile device in the particular navigation context and wherein the instructions cause the one or more processors to perform operations comprising:

adjusting, by the GUI generator, the first template configuration data based on the navigation context; and generating the first GUI based on the map view, the vehicle system attributes, and the adjusted first template configuration data.

19. The system of claim 17, wherein the instructions cause the one or more processors to perform operations comprising:

receiving, by the GUI generator, input data from the vehicle system;

sending, by the GUI generator, the input data to the navigation application:

receiving, by the GUI generator, a second template identifier and a second template configuration data from the navigation application;

in response to receiving the second template identifier and the second template configuration data, generating, by the GUI generator, a second GUI for the navigation application for presentation by the vehicle system based on the second identifier and the second template configuration data; and causing, by the GUI generator, the second GUI to be presented on the first display of the vehicle system.

20. The system of claim 17, wherein the first GUI is comprised of a plurality of GUI layers and where a first layer of the plurality of layers is generated by an operating system of the mobile device, a second layer of the plurality of layers is generated by the navigation application, and a third layer of the plurality of layers is generated by the operating system of the mobile device, and wherein generating the first GUI comprises:
   rendering the third layer over the second layer; and
   rendering the second layer and third layer over the first layer.

21. The system of claim 17, wherein the GUI generator imposes restrictions on the GUIs requested by the navigation application based on the operating context of the vehicle system.

* * * * *